US011234060B2

(12) United States Patent
Parampath et al.

(10) Patent No.: US 11,234,060 B2
(45) Date of Patent: Jan. 25, 2022

(54) WEAVE STREAMING CONTENT INTO A LINEAR VIEWING EXPERIENCE

(71) Applicant: Roku, Inc., Los Gatos, CA (US)

(72) Inventors: Louqman Ackandy Parampath, Dublin, CA (US); Cameron Baharloo, San Carlos, CA (US); Rama Murty Kalluri, San Jose, CA (US); Scott Rosenberg, Glen Ridge, NJ (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 16/047,832

(22) Filed: Jul. 27, 2018

(65) Prior Publication Data

US 2019/0075372 A1 Mar. 7, 2019

Related U.S. Application Data

(60) Provisional application No. 62/553,373, filed on Sep. 1, 2017.

(51) Int. Cl.
*H04N 7/10* (2006.01)
*H04N 7/025* (2006.01)
(Continued)

(52) U.S. Cl.
CPC ......... *H04N 21/8545* (2013.01); *G11B 27/10* (2013.01); *H04N 21/23424* (2013.01);
(Continued)

(58) Field of Classification Search
CPC ......... H04N 21/26241; H04N 21/2665; H04N 21/4668; H04N 21/8545; H04N 21/8549; H04N 21/47217; H04N 21/4755
See application file for complete search history.

(56) References Cited

U.S. PATENT DOCUMENTS 6,002,443 A 12/1999 Iggulden
6,240,555 B1 5/2001 Shoff et al.
(Continued)

FOREIGN PATENT DOCUMENTS

EP 2763427 8/2014

OTHER PUBLICATIONS

Written Opinion and International Search Report of the International Searching Authority for International Application No. PCT/US2018/048760, dated Dec. 14, 2018; 11 pages.
(Continued)

*Primary Examiner* — Gigi L Dubasky
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for providing recommendations based on non-streaming content on a media device. In a non-limiting embodiment, an apparatus, such as a media device, may provide recommendations of related streaming content based on non-streaming content retrieved from non-streaming sources and retrieving the streaming content from distributed streaming sources. The media device may monitor a transmission and display of non-streaming content and create a fingerprint of the non-streaming content based on the monitoring. And based on the fingerprint, the media device may generate recommendations of related or similar streaming content that can be retrieved and displayed by the media device.

20 Claims, 10 Drawing Sheets

US 11,234,060 B2

Page 2

(51) Int. Cl.
*H04N 21/8545* (2011.01)
*H04N 21/44* (2011.01)
*H04N 21/234* (2011.01)
*H04N 21/81* (2011.01)
*H04N 21/431* (2011.01)
*G11B 27/10* (2006.01)
*H04N 21/482* (2011.01)
*H04N 21/475* (2011.01)
*H04N 21/262* (2011.01)
*H04N 21/472* (2011.01)
*H04N 21/8549* (2011.01)

(52) U.S. Cl.
CPC ... *H04N 21/26241* (2013.01); *H04N 21/4312* (2013.01); *H04N 21/44008* (2013.01); *H04N 21/4755* (2013.01); *H04N 21/4758* (2013.01); *H04N 21/47217* (2013.01); *H04N 21/4826* (2013.01); *H04N 21/812* (2013.01); *H04N 21/8549* (2013.01)

(56) References Cited

U.S. PATENT DOCUMENTS

| | | | |
|---|---|---|---|
| 6,970,641 | B1 | 11/2005 | Pierre et al. |
| 7,328,153 | B2 | 2/2008 | Wells et al. |
| 8,020,000 | B2 | 9/2011 | Oostveen et al. |
| 8,413,206 | B1 | 4/2013 | Wyatt et al. |
| 8,694,533 | B2 | 4/2014 | Oztaskent et al. |
| 8,863,165 | B2 | 10/2014 | Gordon |
| 8,949,872 | B2 | 2/2015 | Slaney et al. |
| 8,997,164 | B2 | 3/2015 | Gordon et al. |
| 9,066,114 | B2 | 6/2015 | Oostveen et al. |
| 9,264,508 | B2 | 2/2016 | Wolf et al. |
| 9,264,785 | B2 | 2/2016 | Mallinson |
| 9,372,531 | B2 | 6/2016 | Benson et al. |
| 9,374,630 | B1 | 6/2016 | Nijim et al. |
| 9,407,962 | B2 | 8/2016 | Oostveen et al. |
| 9,420,349 | B2 | 8/2016 | Harper et al. |
| 9,451,294 | B2 | 9/2016 | Khader et al. |
| 9,479,831 | B2 | 10/2016 | Oostveen et al. |
| 9,510,044 | B1 | 11/2016 | Pereira et al. |
| 9,619,854 | B1 * | 4/2017 | Sharifi ............... H04N 21/4826 |
| 10,032,192 | B2 | 7/2018 | Tinsman et al. |
| 10,134,373 | B2 | 11/2018 | Jeffrey et al. |
| 10,182,265 | B2 * | 1/2019 | Frazier ............... H04N 21/4334 |
| 10,275,578 | B2 | 4/2019 | Bilobrov et al. |
| 10,345,892 | B2 | 7/2019 | Benson et al. |
| 10,623,826 | B2 | 4/2020 | Cho et al. |
| 2001/0003214 | A1 | 6/2001 | Shastri et al. |
| 2001/0018769 | A1 | 8/2001 | Matsui |
| 2001/0033296 | A1 | 10/2001 | Fullerton et al. |
| 2002/0073179 | A1 | 6/2002 | Mackintosh et al. |
| 2002/0092019 | A1 | 7/2002 | Marcus |
| 2006/0184579 | A1 | 8/2006 | Mills et al. |
| 2007/0124796 | A1 * | 5/2007 | Wittkotter ............ H04N 21/435 725/136 |
| 2007/0157249 | A1 | 7/2007 | Cordray et al. |
| 2007/0003002 | A1 | 12/2007 | Smith et al. |
| 2008/0010342 | A1 | 1/2008 | Gebhardt et al. |
| 2008/0066107 | A1 | 3/2008 | Moonka et al. |
| 2008/0089551 | A1 | 4/2008 | Heather et al. |
| 2008/0090513 | A1 | 4/2008 | Collins et al. |
| 2008/0092158 | A1 | 4/2008 | Bhatnagar et al. |
| 2008/0209469 | A1 | 8/2008 | Gottlieb et al. |
| 2008/0216137 | A1 | 9/2008 | Van Der Heijden |
| 2008/0229354 | A1 | 9/2008 | Morris et al. |
| 2009/0063277 | A1 | 3/2009 | Bernosky et al. |
| 2009/0213270 | A1 | 8/2009 | Ismert et al. |
| 2009/0248672 | A1 | 10/2009 | McIntire et al. |
| 2010/0011392 | A1 | 1/2010 | Bronstein et al. |
| 2010/0049711 | A1 | 2/2010 | Singh et al. |
| 2010/0186041 | A1 | 7/2010 | Chu et al. |
| 2011/0066942 | A1 | 3/2011 | Barton et al. |
| 2011/0078740 | A1 * | 3/2011 | Bolyukh ................ H04N 21/47 725/41 |
| 2011/0113456 | A1 * | 5/2011 | Ji ..................... H04N 21/47202 725/90 |
| 2011/0135283 | A1 * | 6/2011 | Poniatowki ...... H04N 21/47217 386/297 |
| 2011/0209181 | A1 | 8/2011 | Gupta et al. |
| 2011/0289535 | A1 | 11/2011 | Saffari et al. |
| 2011/0311095 | A1 | 12/2011 | Archer |
| 2012/0117584 | A1 * | 5/2012 | Gordon ................ H04N 21/254 725/19 |
| 2012/0254097 | A1 | 10/2012 | Flinn et al. |
| 2013/0007807 | A1 | 1/2013 | Grenville et al. |
| 2013/0104166 | A1 | 4/2013 | Shah |
| 2013/0132999 | A1 | 5/2013 | Pandey |
| 2013/0205322 | A1 | 8/2013 | Sinha et al. |
| 2013/0254308 | A1 | 9/2013 | Rose et al. |
| 2013/0326570 | A1 | 12/2013 | Cowper et al. |
| 2014/0032565 | A1 | 1/2014 | Parker |
| 2014/0049695 | A1 | 2/2014 | Papish et al. |
| 2014/0193027 | A1 | 7/2014 | Scherf et al. |
| 2014/0196071 | A1 | 7/2014 | Terpstra et al. |
| 2014/0215532 | A1 | 7/2014 | Schmidt et al. |
| 2014/0282653 | A1 | 9/2014 | Ariantaj et al. |
| 2015/0121409 | A1 | 4/2015 | Zhang et al. |
| 2015/0150045 | A1 | 5/2015 | Shovkoplias |
| 2015/0304597 | A1 | 10/2015 | Nagorski et al. |
| 2016/0027059 | A1 | 1/2016 | Lofthus |
| 2016/0036897 | A1 | 2/2016 | Kim et al. |
| 2016/0105428 | A1 * | 4/2016 | Schrempp ........... H04L 65/4076 726/7 |
| 2016/0132931 | A1 | 5/2016 | Levinson |
| 2016/0173961 | A1 | 6/2016 | Coan et al. |
| 2016/0196026 | A1 | 7/2016 | Huang et al. |
| 2017/0103754 | A1 | 4/2017 | Higbie et al. |
| 2017/0201793 | A1 | 7/2017 | Pereira et al. |
| 2017/0251260 | A1 * | 8/2017 | Sanders ............. H04N 21/4668 |
| 2017/0287056 | A1 | 10/2017 | Dohlman |
| 2019/0069004 | A1 | 2/2019 | Badawiyeh |
| 2019/0075353 | A1 | 3/2019 | Parampath et al. |
| 2019/0075371 | A1 | 3/2019 | Parampath et al. |

OTHER PUBLICATIONS

International Preliminary Report on Patentability for International Application No. PCT/US2018/048760, dated Mar. 3, 2020; 8 pages.
Written Opinion and International Search Report of the International Searching Authority for International Application No. PCT/US2018/048757, dated Dec. 14, 2018; 9 pages.
International Preliminary Report on Patentability for International Application No. PCT/US2018/048757, dated Mar. 3, 2020; 7 pages.
Written Opinion and International Search Report of the International Searching Authority for International Application No. PCT/US2018/048754, dated Dec. 13, 2018; 9 pages.
International Preliminary Report on Patentability for International Application No. PCT/US2018/048754, dated Mar. 3, 2020; 7 pages.
Extended European Search Report issued in related European Patent Application No. 18850239.7, dated Dec. 17, 2020; 7 pages.
Jeff Baumgartner, "Ensequence Seeks National Stage With New Interactive Advertising Platform," Broadcasting+Cable (Sep. 18, 2013), https://www.nexttv.com/news/ensequence-seeks-national-stage-new-interactive-advertising-platform-123861. 9 pages.
Whit Clay, "Ensequence Launches AdConneqt+™," Business Wire (Sep. 18, 2013); 2 pages.
IN Press Release: "Ensequence and Audible Magic Team to Deliver Interactive Advertising and TV Across Multiple Devices," Audible Magic (Dec. 10, 2012); 3 pages.
Alex Santos, "All Sony connected TVs to get Ensequence tech in 2013 to serve up contextual content," Engadget (Dec. 4, 2012); 12 pages.
About: Syfy Sync (iOS App Store Version, Apptopia (Jul. 14, 2020), htpp://apptopia.com/ios/app/450488282/about. 5 pages.
Press Release: "zeebox Selects Gracenote to Power Content Recognition on the Second Screen: Gracenote Entourage™ will let zeebox Users Identify what TV Programs are Trending," Sony (Jan. 3, 2013); 3 pages.

(56) References Cited

OTHER PUBLICATIONS

Glen Derene, "Samsung, LG, and Vizio smart TVs are recording-and sharing data about-everything you watch: Consumer Reports investigates the information brokers who want to turn your viewing habits into cash," Consumer Reports: Some Smart TVs Watch What You Watch (Feb. 27, 2015); 4 pages.

Robert Briel, "Samsung invests in content recognit ion provider Enswers," Broadband TV News (Apr. 25, 2014, London), https://www.broadbandtvnews.com/2014/04/25/samsung-invests-in-content-recognition-provider-enswers/. 6 pages.

Oostveen, et al., "Feature Extraction and a Database Strategy for Video Fingerprinting," Recent Advances in Visual Information Svstems: 5th International Conference. VISUAL 2002 Hsin Chu, Taiwan, Mar. 2002 Proceedings; pp. 117-128; 24 pages.

Vincent Flood, "Enswers: the Korean ACR Company with Tech in Every Samsung CTV in North America." Video Ad News (Apr. 15. 2014 ); https://videoadnews.com/2014/04/15/enswers-acr-company-tech-every-samsung-ctv-north-america/. 7 pages.

Megan O'Neil. "Enswers Has ACR Provisioning Partnership With Samsung." Beet TV (Nov. 19, 2012), https://www.beet.tv/2012/11/enswers.html#. 7 pages.

Brian Santo, "Ensequence signs two for interact ive ad service," Electrical Engineering News and Products (Dec. 11, 2013), https://www.eeworldonline.com/ensequence-signs-two-for-interactive-ad-service/. 12 pages.

\* cited by examiner

WEAVE STREAMING CONTENT INTO A LINEAR VIEWING EXPERIENCE

This application claims priority to U.S. Provisional Application No. 62/553,360 filed Sep. 1, 2017, and is related to U.S. patent application Ser. No. 16/047,804 titled "INTERACTIVE CONTENT WHEN THE SECONDARY CONTENT IS SERVER STITCHED," filed herewith, and U.S. patent application Ser. No. 16/047,832 titled "WEAVE STREAMING CONTENT INTO A LINEAR VIEWING EXPERIENCE," filed herewith, all of which are herein incorporated by reference in their entireties.

FIELD

This disclosure is generally directed to delivering supplemental content to a media device, and displaying the delivered supplement content on the media device.

BACKGROUND

With a rise in technology surrounding the control of delivering content, new types of interactions may be used to control the delivery of content including also delivering secondary content. For example, the secondary content can be stitched within the delivery of primary content at a content server. The content server side insertion of secondary content allows content providers to provide the primary content and secondary content together on the content management server (CMS) level rather than on the level of the receiver. But current secondary content technologies, such as measurement, viewability and interactivity, cannot be supported with server side stitching. This is largely due to the fact that interactive components in the secondary content, e.g., overlays and/or microsites, are developed using client side code that renders these components based on the processing capability of the receiver. Alternatively, secondary content may be provided separately from the primary content to the client device. This, however, often causes problems such as pauses or buffering when loading the secondary content with the primary content.

SUMMARY

Provided herein are system, apparatus, article of manufacture, method and/or computer program product embodiments, and/or combinations and sub-combinations thereof, for using technology in innovative ways to provide enhanced media streaming functionality, including providing interactive content by media systems, seamlessly providing secondary content to the media systems, and/or providing recommendations of content based on content being displayed on the media systems as well as user viewing history, to name just two examples.

An embodiment is directed to system, apparatus, article of manufacture, method and/or computer program product embodiments, and/or combinations and sub-combinations thereof, for providing interactive content by a media system based on content received from a content provider, wherein the content may include secondary content stitched into primary content at the content provider. In a non-limiting embodiment, an apparatus, such as a media device, may provide interactive content to the media system. The media device may receive content comprising primary and secondary content from a content provider, and then determine whether the secondary content is a candidate for an interactive experience. The media device may also provide the interactive experience when the secondary content is a candidate for the interactive experience. Furthermore, the media device may monitor tracking information of the interactive experience.

Another embodiment is directed to system, apparatus, article of manufacture, method and/or computer program product embodiments, and/or combinations and sub-combinations thereof, for providing playback of content that includes client side stitching of secondary content to a media system. In a non-limiting embodiment, an apparatus, such as a media device, may provide client side stitching of secondary content to the media system. The media device may receive content comprising primary content from a content provider and analyze metadata of the content to identify secondary content to be presented by the media system. The media device may also retrieve the secondary content from the content provider and pre-buffer the secondary content. The media device may also provide the secondary content.

Yet another embodiment is directed to system, apparatus, article of manufacture, method and/or computer program product embodiments, and/or combinations and sub-combinations thereof, for providing content recommendations from streaming sources based on over the air (OTA) content and/or content received over a network (such as through a cable box or media device, for example) that are provided to television of the user. In a non-limiting embodiment, an apparatus, such as a media device, may provide recommendations of content from streaming sources based on broadcast or OTA content received by an antenna or other means connected to a television. In another embodiment, the apparatus may also provide recommendations of content from streaming sources based on content retrieved, for example, through a cable box or digital video recorder (DVR) connected to the television. The media device may also provide the secondary content. The media device may monitor the video content currently displayed on the television and create a fingerprint of a type of the OTA content, cable box content, and/or streaming content (such as DVR content). And based on the fingerprint, the media device may generate recommendations from streaming sources and display the recommendations on the television. The recommendations may be displayed concurrently with (e.g., as an overlay) or in place of (e.g., as a new screen) currently displayed OTA content, cable box content, and/or DVR content.

While embodiments are described herein with respect to an example of controlling display devices and/or media devices in a media streaming environment, these embodiments and this disclosure are applicable to the delivery of any content in any environment using any process, method, system, apparatus, device, and/or computer program product for delivery.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
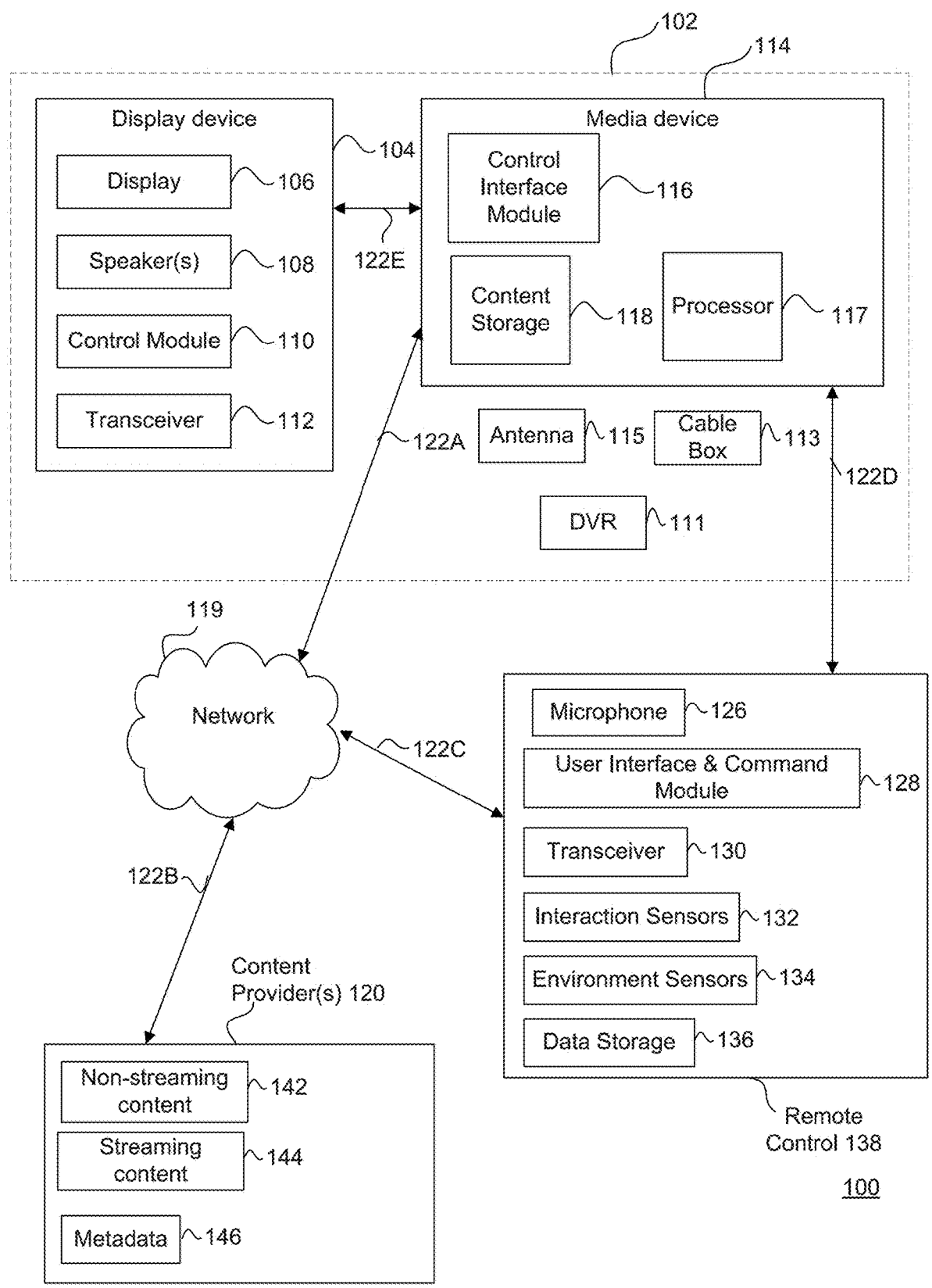
FIG. 1A is a block diagram of a system for delivering or providing content by a media system, according to some embodiments.

FIG. 1A is a block diagram of a system for delivering or providing specific content to electronic devices based on content currently being displayed on the electronic devices, according to some embodiments. In a non-limiting example, the system for providing content is a media system 100.

Media system 100 may include a user media system 102 that includes display device 104, digital video recorder 111, cable box, 113, media device 114, and/or antenna 115. Display device 104 may comprise a television, a monitor, a phone screen, a tablet screen, a projector, or any combination thereof. A person of ordinary skill in the art would understand that display device 104 is not limited to these examples, and that other types of displays are further contemplated according to aspects of the present disclosure.

Media device 114 may comprise a television, a smart phone, a tablet, a streaming device, a gaming console, or any combination thereof. A person of ordinary skill in the art would understand that the media device 114 is not limited to these examples, and that other types of media devices are further contemplated according to aspects of the present disclosure. In some embodiments, the media device 114 can be a part of, integrated with, operatively coupled to, and/or connected to display device 104 through, for example, connection 122E. Media device 114 can be configured to communicate with network 119 through connection 122A. In various embodiments, network 119 can include, without limitation, wired and/or wireless intranet, extranet, Internet, cellular, Bluetooth and/or any other local, regional, global communications network, as well as any combination thereof.

Digital video recorder 111, cable box 113 and/or antenna 115 may be connected to media device 114, such as through a coaxial cable, HDMI cable, etc., and provide content for display by media device 114 on display device 104. Digital video recorder 111 records video content that can be played upon user request. Digital video recorder 111 may also provide trick play features such as pausing, fast forwarding, and/or rewinding the stored content. In some embodiments, digital video recorder 111 may be distinguished from antenna 115 and cable box 113 because digital video recorder 111 provides media device 114 with stored content while antenna 115 and cable box 113 provide media device with live content. For example, antenna 115 provides content to media device 114 by receiving over the air broadcast television signals and relaying the signals to media device 114. Cable box 113 may be a set-top box that converts signals received from a cable television service to a signal that can be displayed by media device 114. In some embodiments, cable box 113 may incorporate a digital video recorder.

Media system 100 may also include one or more content provider(s) 120 (also called content provider device(s) 120 and/or content server(s) 120). Content provider(s) 120 may each include databases to store non-streaming content 142, streaming content 144, and/or metadata 146. Content provider(s) 120 may include cable providers, over-the-air broadcasters, and streaming content providers, to name just some examples. Not all content provider(s) 120 may have both non-streaming content 142 and streaming content 144. In some embodiments, non-streaming content 142 refers to content received by antenna 115 (e.g., over the air) or by cable box 113 (e.g., from a cable provider). In some embodiments, streaming content 144 refers to content provided by streaming content provider(s) 120. In some embodiments, streaming content 144 refers to any content provided over a network connection such as Wi-Fi. Content provider(s) 120 that provide non-streaming content 142 may be considered non-streaming content providers and content provider(s) 120 that provide streaming content 144 may be considered streaming content providers.

According to some embodiments, content provider(s) 120 may transmit non-streaming content 142 and streaming content 144 to media device 114 through network 119. Content provider(s) 120 may be connected to network 119 through connection 122B. For example, if content provider(s) 120 is a streaming content provider, content provider(s) may provide content through connections 122A and 122B and network 119. In some embodiments, content provider(s) 120 may bypass network 119 and directly provide content through connections 122A and 122B. For example, if content provider(s) 120 is an over-the-air broadcaster, connections 122A and 122B are over-the-air connections between the over-the-air broadcaster and antenna 115.

The non-streaming content 142 and streaming content 144 may include any combination of music, videos, movies, TV programs, multimedia, images, still pictures, text, graphics, gaming applications, advertisements, software, and/or any other content or data objects in electronic form. In some embodiments, metadata 146 comprises data about non-streaming content 142 and streaming content 144. For example, metadata 146 may include associated or ancillary information indicating or related to writer, director, producer, composer, artist, actor, summary, chapters, production, history, year, trailers, alternate versions, related content, applications, and/or any other information pertaining or relating to non-streaming content 142 and streaming content 144. Metadata 146 may also or alternatively include links to any such information pertaining or relating to non-streaming content 142 and streaming content 144. Metadata 146 may also or alternatively include one or more indexes of non-streaming content 142 and streaming content 144, such as start and end times of the content.

According to some embodiments, at least some of non-streaming content 142 and streaming content 144 may also be stored in content storage 118 of media device 114. Content storage 118 may comprise random access memory (RAM), read-only memory (ROM), electronically erasable programmable random access memory (EEPROM), hard disk drive (HDD), solid state drive (SSD), or any combination thereof. A person of ordinary skill in the art would understand that content storage 118 is not limited to these examples, and that other types of storage are further contemplated according to aspects of the present disclosure.

In various embodiments, content provider(s) 120 may transmit non-streaming content 142 and streaming content 144 to media device 114 via analog television signals, digital television signals, satellite television signals, analog signals, digital signals, satellite signals, broadcast signals, internet video streaming (including dial-up, broadband, cable, fiber, DSL, wireless, mobile network, and satellite internet, to name just a few examples), internet radio streaming, or any combination thereof, over network 119. A person of ordinary skill in the art would understand these forms of transmitting signals are examples, and that other forms of transmitting signals are further contemplated according to aspects of the present disclosure.

According to some embodiments, content provider(s) 120 may encode and compress non-streaming content 142 and streaming content 144 before it is delivered to media device 114. In embodiments, content provider(s) 120 may encode non-streaming content 142 and streaming content 144 by a plurality of encoding and codec systems, such as NTSC, PAL, SECAM, FM, AM, DAB+, DMB, DTMB, ATSC, ISDB, DVB-S, DVB-S2, DVB-C, DVB-T, DTT, MMDS, MVDS, Flash, MPEG-1, MPEG-4, WMV, VP6, RealVideo, Real Audio, FLAC, ALAC, AMR, EVRC, or any combination thereof. A person of ordinary skill in the art would understand that the encoding and codec systems are not limited to these examples, and that other types of encoding and codec systems are further contemplated according to aspects of the present disclosure.

Media system 100 may include a remote control 138. Remote control 138 can be any component, part, apparatus or method for controlling media device 114 and/or display device 104, such as a remote control, a tablet, laptop computer, smartphone, on-screen controls, integrated control buttons, or any combination thereof. A person of ordinary skill in the art would understand that remote control 138 is not limited to these examples, and that other types of interactive devices are further contemplated according to aspects of the present disclosure. In some embodiments, remote control 138 may comprise transceiver 130 for sending signals to media device 114 to manipulate the content displayed on display device 104. Transceiver 130 may operate according to any communication standard or technique, such as infrared, cellular, Wi-Fi, Bluetooth, to name just a few examples. For example, remote control 138 may send signals to media device 114 to control the speed, volume, channel, scene, screen, color, playback, or any combination thereof of the content displayed on display device 104. According to embodiments, remote control 138 may send signals to media device 114 via connection 122C through network 119 or via connection 122D using infrared communications, fiber communications, wired communications, cellular, Wi-Fi, wireless communications, electromagnetic communications, or any combination thereof. A person of ordinary skill in the art would understand that remote control 138 is not limited to these examples of communications, and that other types of communications are further contemplated according to aspects of the present disclosure.

In various embodiments, remote control 138 may include or be implemented as an audio remote control device. For example, the audio remote control functionality may be implemented using one or more microphones 126. As such, remote control 138 may receive audio commands from a user of media system 100 or another source of audio commands, such as audio from content displayed on display device 104 and output by speaker(s) 108. For example, microphone 126 can be used to receive audio from a movie playing on display device 104. Remote control 138 may transmit control signals corresponding to such audio commands to media device 114, the display device 104, and/or any other component in media system 100, to cause media device 114, display device 104, and/or other component to operate according to the audio commands.

According to various embodiments, remote control 138 may comprise a plurality of interaction sensors 132 that detect user interactions with remote control 138. The plurality of interaction sensors 132 that detect user interactions with remote control 138 may comprise interactive buttons, a camera, a gyroscope, or any combination thereof. A person of ordinary skill in the art would understand that the plurality of interaction sensors 132 are not limited to these examples, and that other types of sensors that detect user interactions with remote control 138 are further contemplated according to aspects of the present disclosure.

In further embodiments, remote control 138 may comprise a plurality of environment sensors 134 that monitor the environment and/or area surrounding or proximate to remote control 138. The plurality of environment sensors 134 may comprise a proximity sensor, a light sensor, a camera, a microphone, a heat sensor, a motion detector, or any combination thereof. A person of ordinary skill in the art would understand that the plurality of environment sensors 134 are not limited to these examples, and that other types of sensors are further contemplated according to aspects of the present disclosure.

According to embodiments, remote control 138 may send sensor data from its sensors 132, 134 to media device 114. For example, the sensor data may be sent via infrared communications, fiber communications, wired communications, Wi-Fi, cellular, wireless communications, electromagnetic communications, or any combination thereof. A person of ordinary skill in the art would understand that remote control 138 is not limited to these examples of communications, and that other types of communications are further contemplated according to aspects of the present disclosure.

Display device 104 may include display 106, speaker(s) 108, control module 110, and transceiver 112. Control module 110 may receive and respond to commands from media device 114 to control the operation of display device 104, such as selecting a source, engaging an interactive content, varying audio and/or video properties, adjusting volume, and/or powering on and off. A person of ordinary skill in the art would understand that the commands are not limited to these examples, and that other types of commands are further contemplated according to aspects of the present disclosure. Control module 110 may receive such commands via transceiver 112. Transceiver 112 may operate according to any communication standard or technique as described herein, such as infrared, cellular, WI-FI, and Bluetooth.

Media device 114 may include control interface module 116 for sending and receiving commands to/from display device 104 and remote control 138, as well as other components in media system 100. In operation, the media system 100 may receive commands or other signals from remote control 138 that is attempting to interact with media device 114 to select content, such as a movie, TV show or song, and/or engage in interactive content. Media device 114 may request the selected content from content provider(s) 120 over network 119. Content provider(s) 120 may transmit the requested content to media device 114. Media device 114 may transmit the content to display device 104 for playback using display 106 and/or speakers 108. The media system 100 may receive commands or other signals from remote control 138 to change settings of display device 104, such as changing the volume, the source, the channel, display and audio settings, to name just a few examples.

Media device 114 may include a processor 117 for executing the processes and operations discussed herein.

In an embodiment, the media system 100 may receive commands on remote control 138 received through interaction with pressing buttons or using a touch screen on remote control 138, such as channel up/down, volume up/down, play/pause/stop/rewind/fast forward, menu, up, down, left, right, to name just a few examples.

In an embodiment, as noted above, user interface and command module 128 in remote control 138 may receive audio input via one or more microphones 126. The audio input may be from a user of media system 100, display device 104 (via the speakers 108), or any other audio source in the media system 100. User interface and command module 128 may analyze the received audio input to recognize trigger words and commands, using any well-known signal recognition techniques, procedures, technologies, etc. User interface and command module 128 may generate command signals compatible with display device 104 and/or media device 114 corresponding to the recognized commands and transmit such command signals to display device 104 and/or media device 114 via transceiver 130, to thereby cause display device 104 and/or media device 114 to operate according to the trigger words and commands.

More particularly, the media system 100 may receive commands from remote control 138 such as an audio command received through microphone 126. For example, to increase the volume, the media system 100 may receive a command through microphone 126, translate the command using processor 117, and determine that the command corresponds to "Volume Up." To change to the immediately preceding channel, the media system 100 may receive a command through microphone 126, translate the command using processor 117, and determine that the command corresponds to "Channel down." In an embodiment, the media system 100 may be configured to wait for a trigger word or phrase that triggers the media system 100 to wait for a command to be received through microphone 126 to better enable remote control 138 to distinguish between commands and other spoken words. For example, the trigger word may be "Command." In this case, to increase the volume, the media system 100 may receive a command corresponding to "Command Volume Up." In an embodiment, there may be one or more trigger words that are recognized by remote control 138.

Embodiments Directed to Interactive Content when Secondary Content is Server Stitched In various embodiments, streaming content 144 delivered to media device 114 may include primary content and secondary content. For example, the secondary content may be "stitched" with (that is, intermixed with) the primary content to form streaming content 144 that is provided by content provider(s) 120 to media device 114 via network 119. In some embodiments, media device 114 determines when to display interactive content based on the positioning of the secondary content in streaming content 144. Interactive content may be related to the primary content, the secondary content, or both. Media device 114 determines when to display interactive content based on information provided with streaming content 144.

In some embodiments, primary content may include, but is not limited to, any content requested by media device 114, and/or any subscribed content. For example, primary content may include, but is not limited to, video clip(s), music, books, software, a television show, sports events, and/or a movie. In some embodiments, secondary content may include, but is not limited to, any content that is related to primary content but not necessarily requested by or subscribed to by media device 114. For example, secondary content may include video, images, textual, internet links, and/or audio content and may include, but is not limited to, an advertisement and/or information relating to or describing the primary content.

Streaming content 144 may include timeslots into which primary content and the secondary content may be inserted to form streaming content 144 that is provided by content provider(s) 120 to the media device 114. Consequently, in some embodiments, the secondary content may be automatically provided to media device 114 without being directly requested by media device 114.

According to some embodiments of the present disclosure, media device 114 may analyze metadata 146 of streaming content 144 to identify when the secondary content is scheduled to be presented on display 106 of display device 104. In some embodiments, media device 114 may analyze a timestamp associated with the secondary content to identify scheduled timeslot(s) within streaming content 144 for starting and ending the display of the secondary content. In some embodiments, the timeslot for secondary content may identify the specific start time, such as 5 minutes, 54 seconds, at which time secondary content is to be displayed. In other embodiments, the timeslot may also identify the specific end time for the display of the secondary content.

Figure 1B:
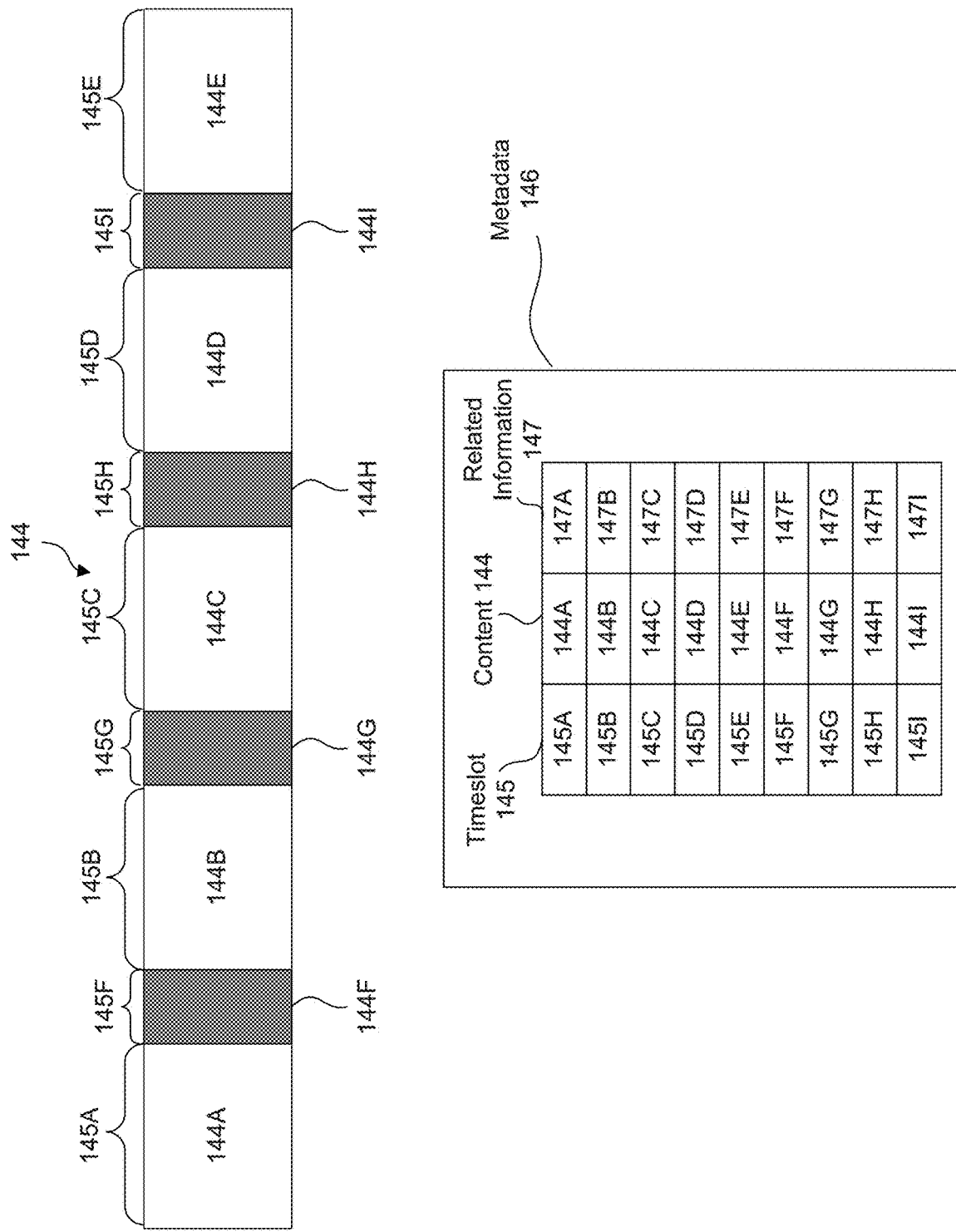
FIG. 1B illustrates example content that includes primary and secondary content, according to some embodiments.

FIG. 1B illustrates example streaming content 144 including primary content 144A-E and secondary content 144F-I, and metadata 146, according to some embodiments. Timeslots 145 include primary timeslots 145A-E and secondary timeslots 145F-I. Primary content 144A-E is displayed during primary timeslots 145A-E and secondary content 144F-I is displayed during secondary timeslots 145F-I. A timeslot may be considered to have a start time and an end time for displaying certain content. For example, the start of secondary timeslot 145F may be considered a start time for displaying secondary content 144F while the end of secondary timeslot 145F (at which the display of second content 144F ends and transitions to primary content 144B in primary timeslot 145B) may be considered an end time for displaying secondary content 144F. Timeslots 145 may be the same or different lengths.

In some embodiments, media device 114 determines when primary content 144A-E and secondary content 144F-I are displayed based on metadata 146 which may include timeslots 145 which includes primary timeslots 145A-E and secondary timeslots 145F-I, content 144A-I, and related information 147A-I. For example, metadata 146 may specify primary content 144A as being displayed during primary timeslot 145A and any related information 147A. In some embodiments, related information 147A-I identifies the subject matter, any related content such as related episodes or other related television shows, or any other related information that is related to or useful to display corresponding content 144A-I. For example, metadata 146 may identify secondary content 144F as being displayed during secondary timeslot 145F and related information 147F may identify any interactive content related to secondary content 144F. Related information 147F may further identify the location of the related interactive content. For example, related interactive content may be stored at a local storage location, such as content storage 118 if previously downloaded or pushed to media device 114 or at a remote storage location such as content server(s) 120, or may include a link to content or information on the Internet.

Accordingly, media device 114 may determine whether any of secondary content 144F-I is a candidate for an interactive user experience based on metadata 146. The interactive user experience may include presenting additional interactive content concurrently with any of secondary content 144F-I that are determined to be interactive user experience candidates. In some embodiments, media device 114 may determine whether there is interactive content associated with secondary content 144F-I based on metadata 146 indicating a number of factors that may be considered by media device 114. One example of a factor is the determined subject matter of secondary content 144F-I. For example, media device 114 may determine, from related information 147 in metadata 146, that secondary content 144F-I is related to a motor vehicle and then determine whether any interactive content related to the motor vehicle is available for the interactive user experience. A person of ordinary skill in the art would understand that secondary content 144F-I and interactive content are not limited to a motor vehicle, and that other types of secondary content and interactive content are further contemplated according to aspects of the present disclosure. Other factors that can be considered by media device 114 include, but are not limited to, a company associated with secondary content 144F-I and the length of secondary content 144F-O. For example, interactive content may be coded to be displayed when secondary content 144F-I of a predetermined length is displayed on the television.

As an example, if secondary content 144F is determined to be a candidate for an interactive experience, media device 114 may present the interactive content concurrently with secondary content 144F on display device 104. Media device 114 determines the appropriate timeslot in which to display the interactive content based in part on metadata 146 that is provided with streaming content 144. Examples of concurrent presentation on display device 104 include, but are not limited to, superimposing the interactive content over secondary content 144F as an overlay, displaying the interactive content alongside secondary content 144F, and superimposing secondary content 144F over the interactive content. The manner in which interactive content is displayed may be specified by the corresponding related information 147F. In some embodiments, the interactive content may be a microsite or gallery of images related to secondary content 144F. Additionally, or alternatively, media device 114 may provide to display device 104 a different version of secondary content 144F, such as an extended version or interactive version of secondary content 144F, as the interactive content. In some embodiments, media device 114 may request the different version of secondary content 144F from content provider(s) 120 or retrieve the different version from content storage 118. Even further, or alternatively, the interactive content may be a form by which media device 114 may request contact information, such as a mobile device number or email address, from the user of media system 100. In some embodiments, when secondary content 144F is a candidate for the interactive experience, media device 114 provides a notification for display by media system 100 that interactive content is available.

In other embodiments, media device 114 may also determine whether any of primary content 144A-E is a candidate for an interactive user experience based on metadata 146. The interactive user experience may include presenting additional interactive content concurrently with any of primary content 144A-E that are determined to be interactive user experience candidates. In some embodiments, media device 114 may determine whether there is interactive content associated with primary content 144A-E based on metadata 146 associated with primary content 144A-E such as the determined subject matter of primary content 144A-E.

Referring back to FIG. 1A, in some embodiments, when the interactive content is determined to be available and displayed on the television, the media system 100 may allow interaction with the interactive content using remote control 138. For example, the media system 100 may receive an indication that a user is engaging with the interactive content using microphone 126, interaction sensors 132 and/or environment sensors 134. That is, the media system 100 may receive voice commands using microphone 126, select the interactive content based on received inputs such as from interactive buttons, gestures, or a predetermined motion of remote control 138, to name just a few examples. Thus, the interactive content may include interactive display elements such as buttons, text, hyperlinks, etc. Furthermore, the interactive content may cause a prompt to be displayed by media system 100. Prompts may include a request to scan a quick response ("QR") code, to enter contact information such as a mobile device number and/or an email address, to select a button to view more content, or to select a button to open a microsite, to name just a few examples.

In further embodiments, media device 114 may store at least some of the interactive content in content storage 118. Media device 114 may also receive automatic updates of streaming content 144, which may include primary content 144A-144E and/or secondary content 144F-144I, either separately or stitched together as discussed above with respect to FIG. 1B by content provider(s) 120. Media device 114 may also receive automatic updates of the interactive content. For example, content provider(s) 120 may automatically transmit updated primary content and secondary content (separately or stitched together), and interactive content to media device 114 at periodic intervals. Media device 114 may then automatically update content storage 118 with primary content 144A-E, secondary content 144F-I, and any interactive content. Alternatively, media device 114 may retrieve the interactive content from content provider(s) 120 that provided the streaming content 144 being transmitted to media device 114 of media system 100, or in the alternative, media device 114 may retrieve the interactive content from a different one of content provider(s) 120, i.e., a third-party vendor.

In some embodiments, the interactive content is displayed on display device 104 automatically upon retrieval or download by media device 114. To be displayed on display device 104, the interactive content may be inserted into timeslots 145 of streaming content 144 or kept as a separate content stream. In embodiments when the interactive content is a separate content stream, when the interactive content is displayed, media device 114 may pause streaming content 144 if it is currently being displayed on display device 104. Media device 114 may determine whether secondary content 144F-I (that has been stitched into secondary timeslots 145F-I of streaming content 144) is being displayed on display device 104 and whether the interactive content is related to the displayed secondary content 144F-I. Media device 114 may display the interactive content concurrently with or subsequent to secondary content 144F-I being displayed on display device 104.

In some embodiments, interactive content is displayed when the user of media system 100 actively engages in the interactive experience, such as through selection or interaction with a display element (e.g., a button on a notification) on display device 104. In other embodiments, the interactive content is displayed when media system 100 receives a command to pause streaming content 144.

In embodiments when the interactive content is inserted into secondary timeslots 145F-I of streaming content 144, streaming content 144 is not paused but displays the interactive content when a timeslot of secondary timeslots 145F-I is reached during playback. In order to insert the interactive content into the timeslot of secondary timeslots 145F-I, media device 114 may examine metadata 146 associated with secondary content 144F-I and/or interactive content to determine when to display the interactive content in relation to primary content 144A-E and secondary content 144F-I. As one example, metadata 146 of secondary content 144G indicates that interactive content may be inserted into secondary timeslot 145G. Media device 114 may then insert the interactive content into secondary timeslot 145G. Accordingly, when media device 114 reaches secondary timeslot 145G during display of streaming content 144, the interactive content may be displayed on the display device 104.

In embodiments when the interactive content is displayed as a separate content stream from streaming content 144, media device 114 may pause streaming content 144 if it is currently being displayed on display device 104. Media device 114 may then display the interactive content while streaming content 144 is paused. Media device 114 may continue presenting streaming content 144 when media device 114 determines that the interactive experience is finished. In some embodiments, media device 114 may determine that the interactive experience is finished by, for example, determining that secondary content 144F-I has stopped, determining that the user has provided the requested information, or determining that the interactive content has been closed (e.g., receiving an input from remote control 138). Accordingly, upon completion of the interactive experience, media device 114 may resume presenting streaming content 144 from the point at which streaming content 144 was paused.

In some embodiments, media device 114 may monitor tracking information related to secondary content 144F-I and the interactive content. For example, media device 114 can monitor how much or how long secondary content 144F-I is displayed by media system 100 on display device 104, e.g., what percentage of secondary content 144F-I is presented by media device 114 on the display device 104, and/or how frequently media system 100 receives inputs from remote control 138 during the presentation of the interactive content. For example, media device 114 may measure the frequency of user engagement by tracking the frequency of inputs received from remote control 138 during presentation of secondary content 144F-I and the interactive content. Accordingly, media device 114 may collect the tracking information by monitoring any received inputs during presentation of the secondary content 144F-I and/or interactive content. Received inputs may include inputs provided by a user interacting with remote control 138. Furthermore, media device 114 may transmit the collected tracking information to content provider(s) 120. For example, if the secondary content 114F-I and/or associated interactive content relates to a promotional item, such tracking information may reflect the effectiveness of the promotional item. Such promotion items can include, for example, an extreme weather warning, an amber alert, public safety message, advertisement, upcoming content message, etc., to name just a few examples.

Figure 1C:
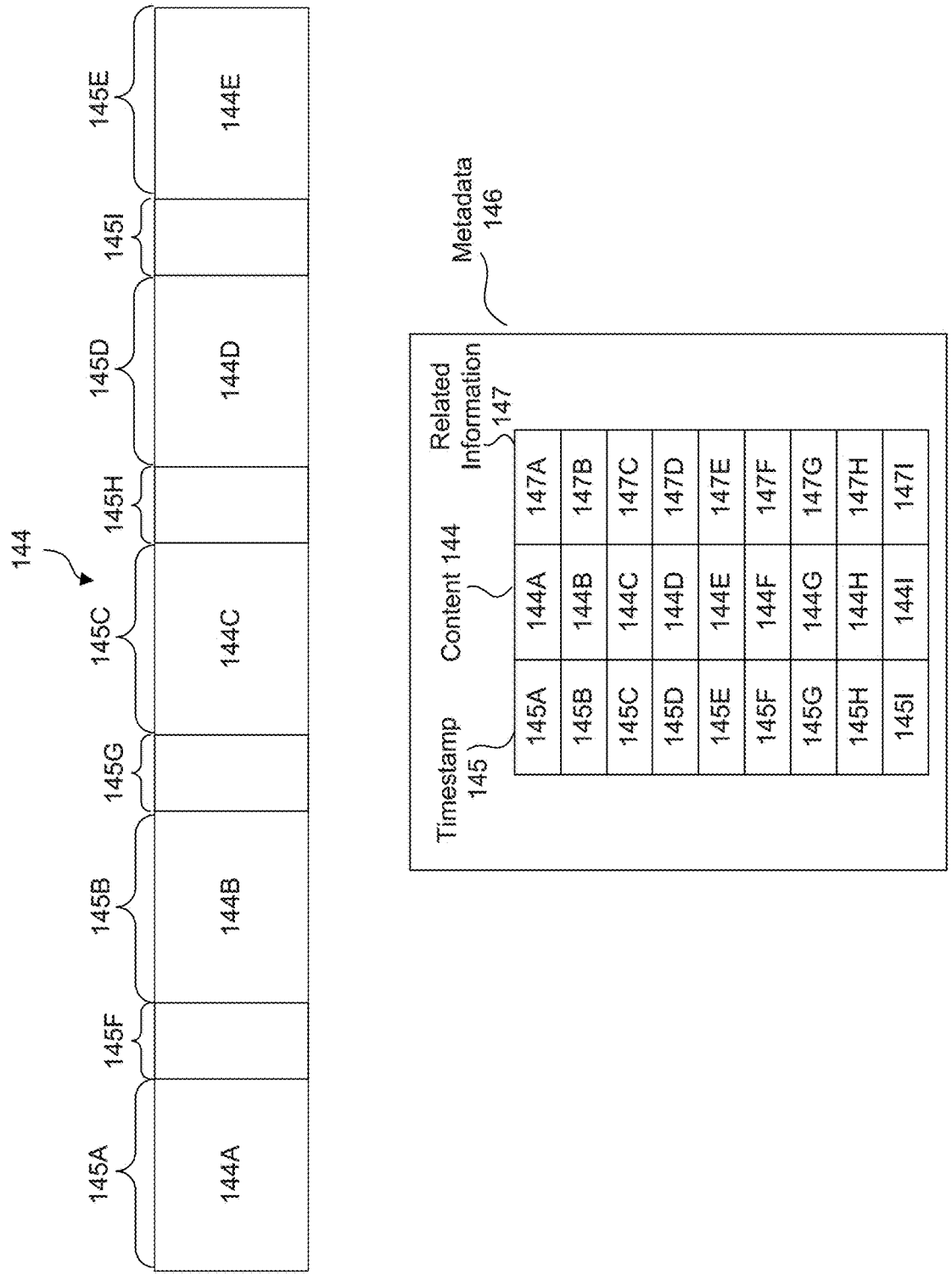
FIG. 1C illustrates example content that includes primary content and secondary timeslots for secondary content, according to some embodiments.

FIG. 1C illustrates streaming content 144 including primary content 144A-E displayed in primary timeslots 145A-E and secondary timeslots 145F-I, according to some embodiments. As described with respect to FIG. 1B, primary content 144A-E is displayed to display device 104 during primary timeslots 145A-E. However, in some embodiments, streaming content 144 received by media device 114 from content provider(s) 120 may have secondary timeslots 145F-I into which media device 114 may insert additional content such as secondary content 144F-I and/or related interactive content.

In some embodiments, media device 114 determines the additional content to be inserted into secondary timeslots 145F-I based on metadata 146 which may include secondary timeslots 145A-I, content 144A-I, and related information 147A-I, as shown in FIG. 1C. For example, metadata 146 may identify secondary content 144F as being inserted into during secondary timeslot 145F. In other embodiments, metadata 146 may identify several different content items as candidates to be inserted into secondary timeslot 145F and media device 114 may select one of the different content items for insertion. Accordingly, based on metadata 146, media device 114 may insert secondary content 144F or any content identified in related information 147F into secondary timeslot 145F of streaming content 144. In some embodiments, content provider(s) 120 may deliver or push secondary content 144F and/or related information 147F to content storage 118 of media device 114. Media device 114 may retrieve secondary content 144F from local memory such as content storage 118. In one embodiment, secondary content 144F may be delivered or pushed concurrently with the delivery of content 144 to media device 114. In another embodiment, secondary content 144F may be delivered or pushed concurrently prior to the delivery of streaming content 144 to media device 114. In yet another embodiment, secondary content 144F may be delivered or pushed concurrently after the delivery of streaming content 144 to media device 114. Related information 147 may identify the subject matter of streaming content 144, the storage location of streaming content 144, and/or any related content such as interactive content.

Figure 2:
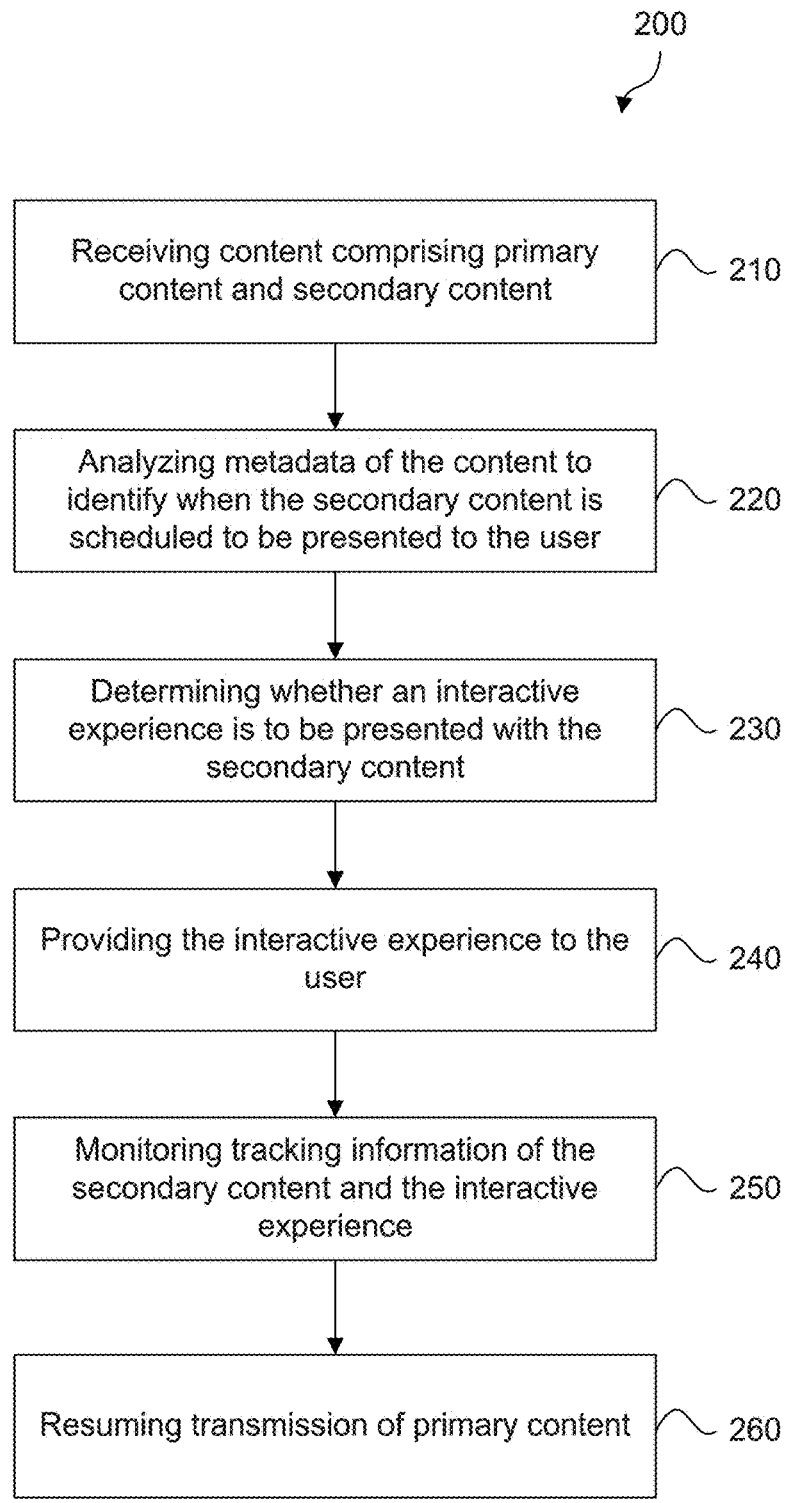
FIG. 2 illustrates a method for providing interactive content by a media system, according to some embodiments.

FIG. 2 illustrates a method 200 for providing interactive content to a media system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. For illustrative purposes, FIG. 2 is described with respect to FIGS. 1A-1B, but method 200 is not limited to these example embodiments.

At 210, media device 114 may receive streaming content 144 from a content provider 120. The streaming content 144 may include primary content 144A-E and secondary content 144F-I, and may also include metadata 146 associated with the streaming content 144. Metadata 146 may include timeslots (also called timestamps) 145 of both primary content 144A-E and secondary content 144F-I. In some embodiments, timeslots 145 may identify the locations within the streaming content 144 in which primary content 144A-E and secondary content 144F-I are displayed (as such, collectively timeslots 145A-I may represent a schedule or index of the primary content 144A-E and the secondary content 144F-I within streaming content 144). For example, metadata 146 of secondary content 144F may include a timestamp of 5:50 which indicates that secondary content 144F is displayed at the 5 minute 50 second mark as streaming content 144 is displayed by media device 114. Media device 114 may also utilize metadata 146 to determine when interactive content is to be displayed in relation to the associated secondary content 144F-I. For example, metadata 146 may include related information 147G which indicates that secondary content 144G is associated with certain interactive content to be displayed with secondary content 144G. In some embodiments, related information 147G may indicate any information related to secondary content 144G such as a list of interactive content and media device 114 may select one item to be displayed, the manner in which the interactive content is to be displayed with secondary content 144G, and/or the location of interactive content.

At 220, media device 114 may analyze metadata 146 of streaming content 144 to identify when secondary content 144F-I is scheduled to be presented by media device 114. For example, in step 220, media device 114 may analyze timeslots 145 in metadata 146 to determine a predetermined timeslot having a scheduled start time(s) and end time(s) for secondary content 144F-I within the received streaming content 144. Thus, the media device 114 in step 220 operates to determine where secondary content 144F-I is "stitched in" primary content 144A-E within the received streaming content 144.

At 230, media device 114 may determine whether an interactive experience is to be presented with secondary content 144F-I when presenting the received streaming content 144 on display device 104. In performing step 230, media device 114 may determine whether secondary content 144F-I is a candidate for an interactive user experience. In particular, media device 114 may analyze related information 147A-I of metadata 146 associated with secondary content 144F-I to identify a subject matter type of secondary content 144F-I. For example, media device 114 examines related information field 147G which may contain information relating to the subject matter of secondary content 144G, such as a network location of the interactive content. Media device 114 may then directly retrieve the interactive content from the specified network location.

At 240, media device 114 may provide the interactive experience by, for example, superimposing interactive content over any of secondary content 144F-I when determined to be a candidate for an interactive experience. For example, the interactive content may be a microsite or gallery of images related to any of secondary content 144F-I. Additionally, or alternatively, providing the interactive experience may include presenting an extended version of secondary content 144F-I as the interactive content. For example, if secondary content 144F is an advertisement, the interactive experience may be an extended version of the advertisement that includes interactive elements that request a user's engagement with secondary content 144F. As an example, the user's engagement is provided through interaction with remote control 138 and inputs provided by remote control 138 to media device 114. Even further, or alternatively, media device 114 may provide the interactive experience by requesting contact information, such as a mobile device number or email address, from the user. At 240, media device 114 may also display a notification on display device 104 that the interactive content is available for viewing. Media device 114 may further receive from an interactive device, such as remote control 138, a command to engage with the interactive content.

At 250, media device 114 may monitor tracking information of secondary content 144F-I and the interactive experience by monitoring how much (i.e., the duration) of secondary content 144F-I media device 114 presents and how frequently media device 114 receives inputs from remote control 138 during the presentation of the interactive content. For example, media device 114 may collect tracking information by tracking the duration of time at which secondary content 144F-I is displayed and/or the number of button presses received by media device 114 from remote control 138. Furthermore, media device 114 may transmit the tracking information to the content provider(s) 120.

At 260, media device 114 may resume presentation of primary content 144A-E on display device 104 by providing or continuing playback of the paused primary content 144A-E when media device 114 determines that that the interactive experience is completed, when media device 114 determines that the user has provided the information requested by the interactive content, or when media device 114 determines that the user closes the interactive content.

Figure 3:
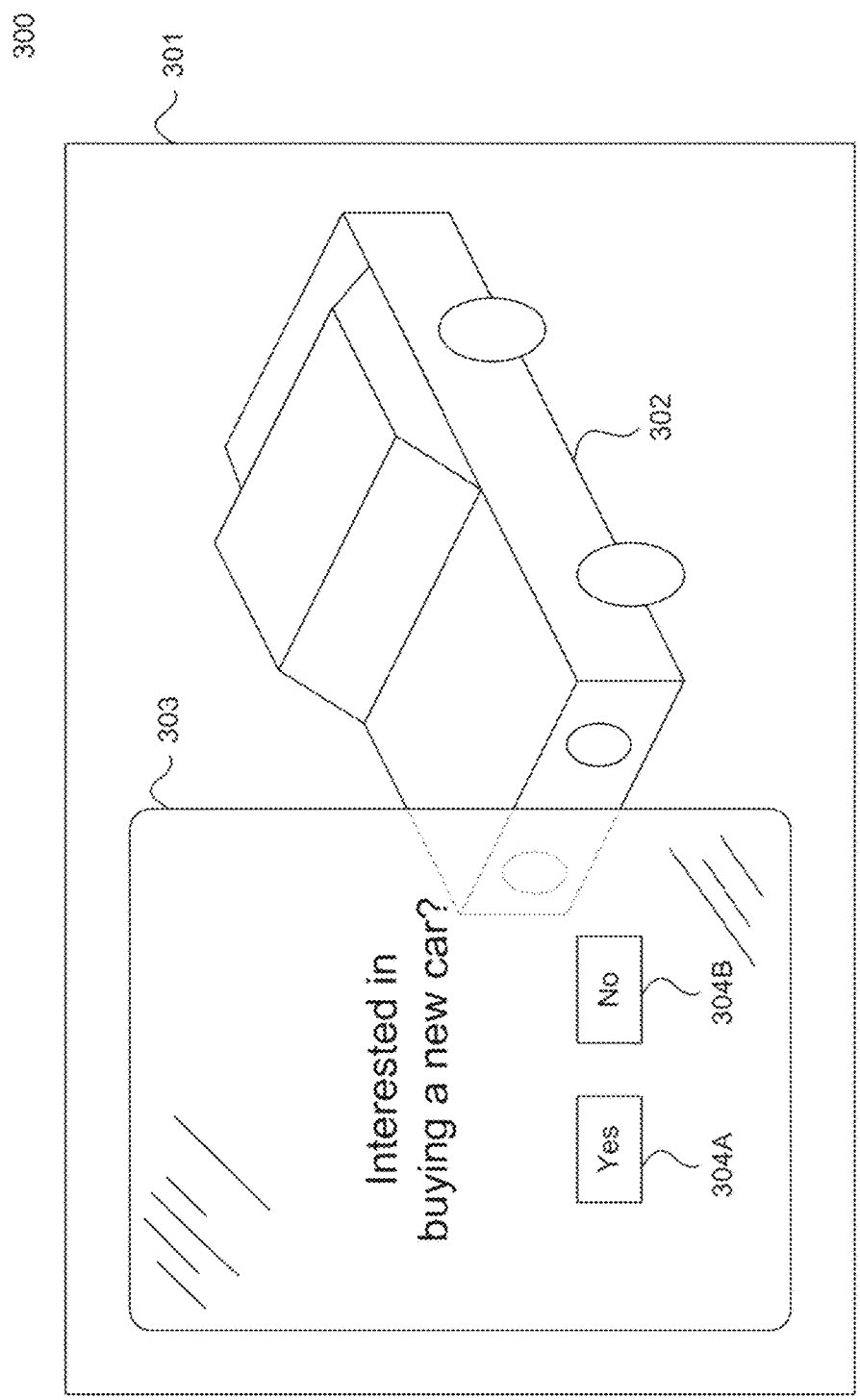
FIG. 3 illustrates an example graphical user interface for providing interactive content by a media system, according to some embodiments.

FIG. 3 illustrates an example graphical user interface 301 for providing interactive content according to some embodiments. For illustrative purposes, FIG. 3 is described with respect to FIGS. 1A-1B, but is not limited to these example embodiments. Graphical user interface 301 may be provided by media device 114 and displayed by display device 104. Graphical user interface 301 may include content 302, such as secondary content 144F-I, as described above. In some embodiments, media device 114 determines that content 302 is related to a motor vehicle, and then determines whether any interactive content related to content 302 is available for the interactive user experience. For example, media device 114 may analyze metadata 146 of content 302 to determine a subject matter of content 302 and/or perform image recognition of displayed images from content 302. Performing image recognition of any displayed images from the content 302 may entail analyzing the displayed images of content 302 and determining the subject matter of content 302 based on the recognized images. Once the subject matter of content 302 is determined, media device 114 may then determine whether any interactive content is associated with the subject matter of content 302. Media device 114 may query content provider(s) 120 by transmitting a request for content related to the determined subject matter.

For example, media device 114 may determine that interactive content 303 is associated with content 302 based on determining that the subject matter of content 302 is a motor vehicle. Media device 114 may then receive from content provider(s) 120 interactive content 303 related to motor vehicles. Media device 114 may further instruct display device 104 to display the received interactive content 303 concurrently with content 302. In some embodiments, media device 114 overlays interactive content 303 over content 302. Interactive content 303 may include interactive display elements such as buttons 304A and 304B which allow the user to engage with and provide responses to interactive content 303.

Figure 4:
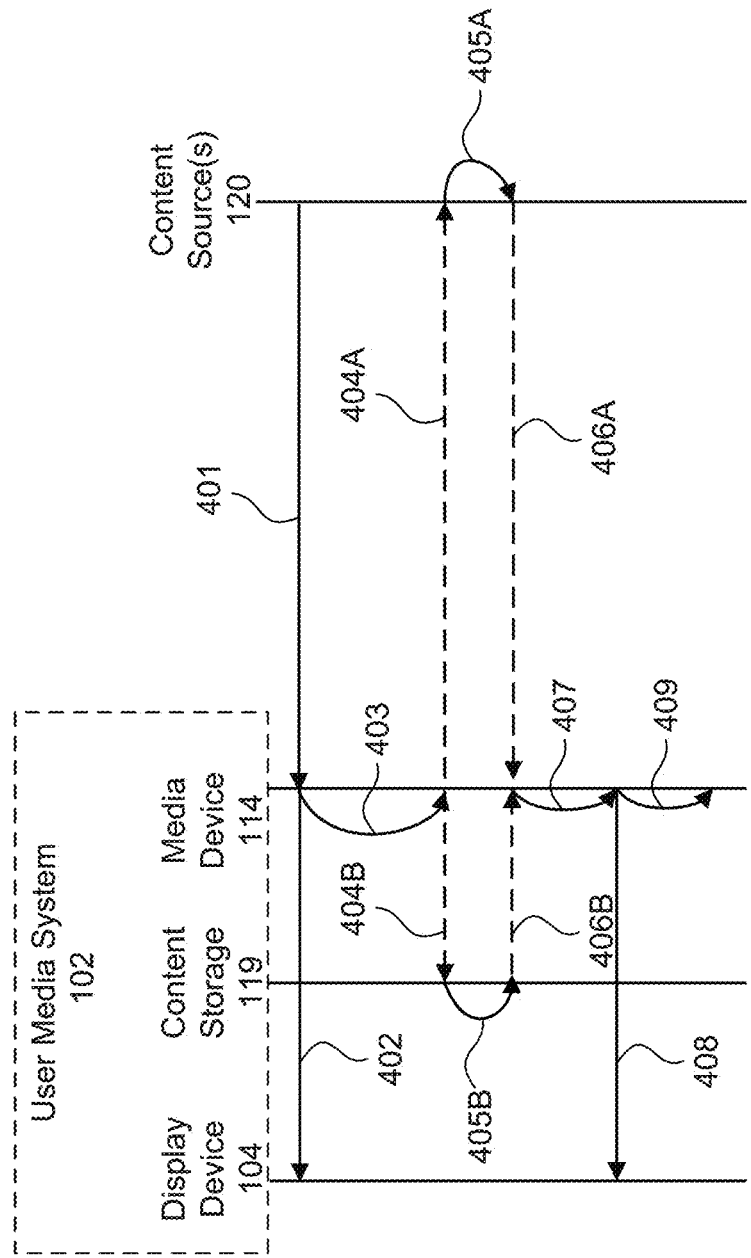
FIG. 4 illustrates communication and functionality in a media system for providing and displaying interactive content, according to some embodiments.

Communication in media system 100 between user media system 102 and with content provider(s) 120 during method 200 is shown in FIG. 4, according to some embodiments. At 401, content provider(s) 120 provides streaming content 144 to media device 114. In some embodiments, streaming content 144 includes both primary content 144A-E and secondary content 144F-I stitched together at the content provider(s) 120. As discussed above, streaming content 144 includes timeslots 145A-E into which primary content 144A-E is inserted and timeslots 145F-I into which secondary content 144F-I is inserted and control when primary content 144A-E and secondary content 144F-I are displayed on display device 104.

At 402, media device 114 provides streaming content 144 to display device 104 for display to a user. While streaming content 144 is displayed on display device 104, media device 114 may analyze metadata 146 of streaming content 144 at 403. Analysis 403 may include identifying timeslots 145 within streaming content 144 specifying when secondary content 144F-I is scheduled to be played, and analyzing metadata 146 associated with streaming content 144 to determine whether interactive content is available to be displayed on display device 104. For example, media device 114 may determine that secondary content 144F-I is to be displayed at secondary timeslots 145F-I of streaming content 144. Media device 114 may then retrieve, from content provider(s) 120, any interactive content determined to be associated with secondary content 144F-I.

When media device 114 determines that interactive content is available and is to be displayed with secondary content 144F-I, media device 114 next determines the location of the interactive content, which may be stored locally at content storage 118 and/or remotely at content provider(s) 120. If media device 114 determines that the interactive content is stored at content provider(s) 120, media device 114 retrieves the interactive content from content provider(s) 120 at 404A. Alternatively, at 404B, media device 114 locally retrieves the interactive content from content storage 118. In some embodiments, content provider(s) 120 preemptively delivers interactive content associated with the content provided to media device 114 prior to media device 114 performing its analysis, such as concurrently with the content at 401.

At 405B, content storage 118 locates the interactive content. Content storage 118 then provides the interactive content to media device 114 at 406B. Alternatively, if the interactive content is stored remotely, content provider(s) 120 locates the interactive content at 405A, and provides it to media device 114 at 406A.

At 407, media device 114 analyzes the interactive content to determine a timeslot 145 for displaying the interactive content on display device 104. This analysis may include processing metadata 146 to determine that certain interactive content associated with secondary content 144F-I should be displayed as an overlay and/or at secondary timeslots 145F-I of streaming content 144. For example, media device 114 may determine from related information 147H that secondary content 144H has associated interactive content that is to be displayed concurrently with secondary content 144H at secondary timeslot 145H of streaming content 144. At 408, media device 114 provides the interactive content to display device 104 for display with secondary content 144F-I at secondary timeslots 145F-I of streaming content 144. In some embodiments, display of interactive content may involve inserting the interactive content into secondary timeslots 145F-I of streaming content 144, while in other embodiments, the interactive content is displayed as a separate content stream while streaming content 144 is paused at secondary timeslots 145F-I. At 409, media device 114 monitors tracking information of secondary content 144F-I and the interactive content such as, but not limited to, monitoring how much of secondary content 144F-I the media device 114 presents on display device 104 and/or how frequently media device 114 receives user input during presentation of secondary content 144F-I and the interactive content.

Embodiments Directed to Client Side Stitching of Secondary Content

Referring back to FIG. 1C, streaming content 144 may include primary content 144A-E and secondary timeslots 145F-I in which media device 114 may stitch in additional content, such as secondary content 144F-I, according to some embodiments. In various embodiments, media device 114 may receive streaming content 144 that includes primary content 144A-E in primary timeslots 145A-E and available space in secondary timeslots 145F-I. According to aspects of the present disclosure, media device 114 may analyze metadata 146 associated with streaming content 144 to identify when media device 114 is scheduled to display secondary content 144F-I. For example, media device 114 may analyze timeslots 145 associated with metadata 146 to determine secondary timeslots 145F-I with a scheduled start time and end time of the secondary content within the streaming content 144 as discussed above. Additionally, media device 114 may analyze metadata 146 to determine which secondary content 144F-I to display on display device 104.

In some embodiments, based on or using metadata 146, media device 114 may schedule retrieval of secondary content 144F-I from content provider(s) 120. Media device 114 may prefetch secondary content 144F-I at a time or under conditions that would allow media device 114 to insert secondary content 144F-I into secondary timeslots 145F-I such that streaming content 144 that includes both primary content 144A-E and secondary content 144F-I may be displayed without buffering. Accordingly, in some embodiments, streaming content 144 initially provided to media device 114 may include only primary content 144A-E and secondary timeslots 145F-I into which secondary content 144F-I are to be inserted. Media device 114 may monitor metadata 146 provided with streaming content 144 to determine secondary content 144F-I to be inserted into corresponding secondary timeslots 145F-I. Based on metadata 146, media device 114 may prefetch secondary content 144F-I as needed and prior to when the timeslot is to be displayed on display device 104. Media device 114 may insert the prefetched secondary content 144F-I into corresponding secondary timeslots 145F-I while streaming content 144 is being displayed on display device 104. Accordingly, streaming content 144 may be displayed without having to buffer or wait for retrieval of secondary content 144F-I.

After determining when secondary content 144F-I is scheduled to play within content 144 and which secondary content 144F-I to provide based on streaming content 144, media device 114 may query content provider(s) 120 for secondary content 144F-I. In some embodiments, media device 114 queries content provider(s) 120 for secondary content 144F-I and pre-buffers the received secondary content 144F-I prior to the start time of corresponding secondary timeslots 145F-I. For example, after buffering primary content 144A-E, media device 114 queries content provider 120 for secondary content 144F-I and pre-buffers secondary content 144F-I while primary content 144A-E is being provided by media device 114 to the display device 104 of user media system 102. In this way, media device 114 provides a seamless streaming of streaming content 144 to the display device 104 that includes primary content 144A-

E, secondary content F-I, and any related interactive content. Consequently, secondary content 144F-I may be seamlessly "stitched in" primary content 144A-E.

In some embodiments, primary content 144A-E and secondary content 144F-I may be encoded in different formats. For example, primary content 144A-E (or secondary content 144F-I) may be formatted using an HTTP Live Streaming ("HLS") format whereas secondary content 144F-I (or primary content 144A-E) may be formatted using an MPEG-4 Part 14 ("MP4") format. In some embodiments, to seamlessly provide primary content 144A-E and secondary content 144F-I, media device 114 separates primary content 144A-E into audio components and visual components and also separates secondary content 144F-I into audio components and visual components. In embodiments, the audio components and visual components of primary content 144A-E are streamed to user media system 102 while the audio components and visual components of secondary content 144F-I are pre-buffered by media device 114. As such, media device 114 may start presenting secondary content 144F-I at the start time of corresponding secondary timeslots 145F-I for secondary content 144F-I. Meanwhile, while secondary content 144F-I is being presented by user media system 102, media device 114 pre-buffers primary content 144A-E such that primary content 144A-E may be presented by user media system 102 at the conclusion or end time of corresponding secondary timeslots 145F-I for secondary content 144F-I.

Media device 114 may analyze metadata 146 of primary content 144A-E to determine secondary content 144F-I to be provided by user media system 102. For example, media device 114 may analyze metadata 146 of primary content 144A-E to determine the genre or subject matter of primary content 144A-E and then may retrieve secondary content 144F-I based on the determined genre of primary content 144A-E. In further embodiments, media device 114 retrieves secondary content 144F-I from content provider(s) 120 and stores secondary content 144F-I in content storage 118. In some embodiments, a portion of content storage 118 can be used for secondary content 144F-I. As such, media device 114 can locally retrieve secondary content 144F-I at any time while primary content 144A-E is presented by user media system 102 and then pre-buffer secondary content 144F-I prior to the start time for corresponding secondary timeslots 145F-I. Alternatively, media device 114 can store primary content 144A-E in content storage 118, and as primary content 144A-E is presented by user media system 102 on display device 104, media device 114 can retrieve secondary content 144F-I from content provider(s) 120 when there is sufficient memory in content storage 118 for secondary content 144F-I. In this way, media device 114 can dedicate content storage 118 to primary content 144A-E.

Figure 5:
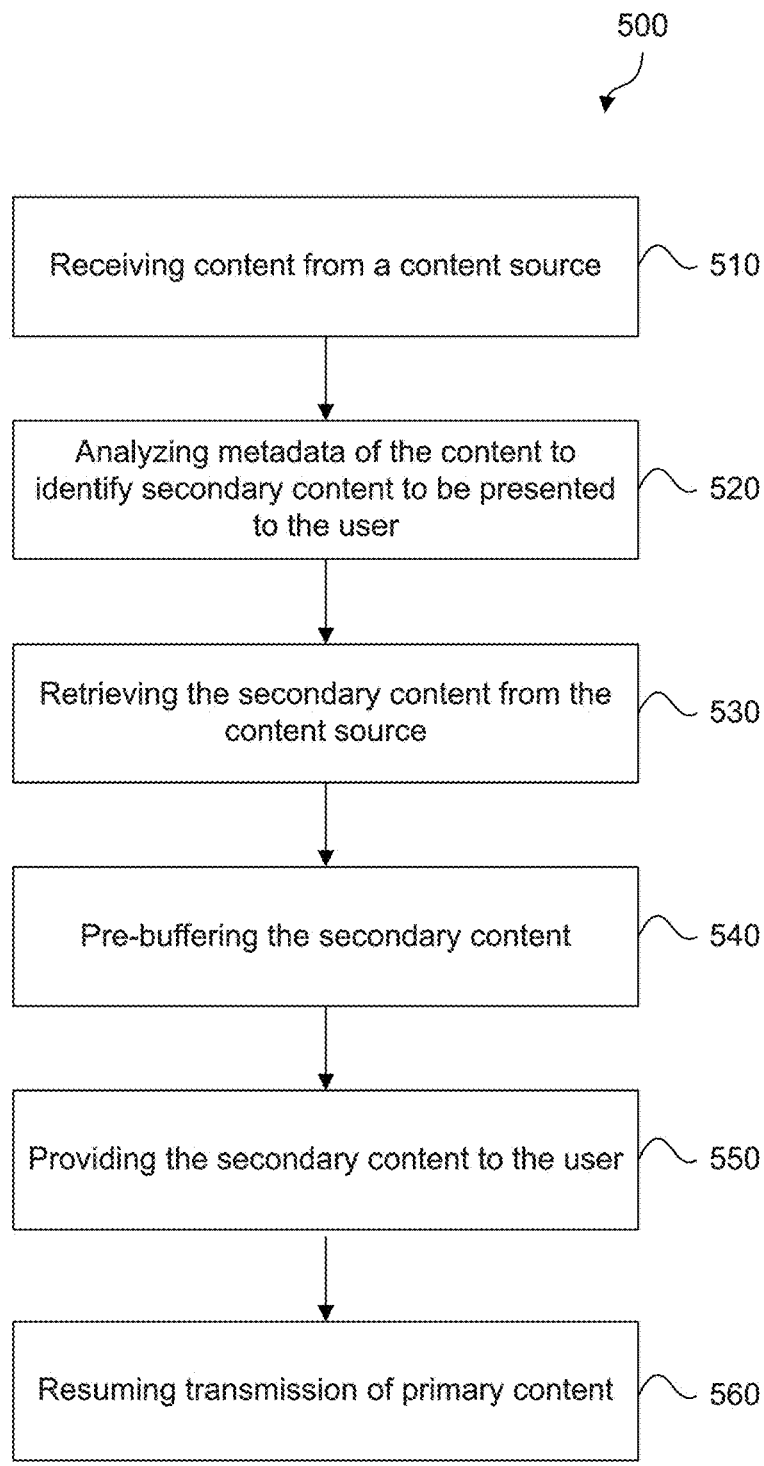
FIG. 5 illustrates a method for providing client-side stitching of secondary content by a media system, according to some embodiments.

FIG. 5 illustrates method 500 for providing client-side stitching of secondary content to user media system 102, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. For illustrative purposes, FIG. 5 is described with respect to FIGS. 1A and 1C, but is not limited to these example embodiments.

Method 500 may include media device 114 receiving streaming content 144 from content provider(s) 120 at 510, which in some embodiments, may include receiving primary content 144A-E from content provider(s) 120.

At 520, media device 114 may analyze metadata 146 of streaming content 144 to identify secondary content 144F-I to be presented on display device 104. This may include analyzing metadata 146 to determine secondary timeslots 145F-I for secondary content 144F-I. Additionally, media device 114 may further analyze metadata 146 to determine which secondary content 144F-I to present on display device 104. In some embodiments, determining which secondary content 144F-I to present may include analyzing metadata 146 of primary content 144A-E to determine the genre of primary content 144A-E, and retrieving secondary content 144F-I based on the genre of primary content 144A-E. For example, secondary content 144F-I may be within the same genre (e.g., comedy) or otherwise be linked to the genre of primary content 144A-E At 530, media device 114 may retrieve secondary content 144F-I from content provider(s) 120 after determining secondary timeslots 145F-I for secondary content 144F-I. Based on secondary slots 145F-I, media device 114 determines a start time to begin presenting secondary content 144F-I. Media device 114 may retrieve secondary content 144F-I from content provider(s) 120 by querying content provider(s) 120 for secondary content 144F-I while primary content 144A-E is presented by media device 114. In further embodiments, media device 114 may further store secondary content 144F-I in a buffer, e.g., content storage 118, as discussed with respect to FIG. 1A. In some embodiments, a dedicated portion of content storage 118 may store secondary content 144F-I. As such, media device 114 may retrieve secondary content 144F-I at any time while primary content 144A-E is presented on display device 104. Accordingly, secondary content 144F-I can be pre-buffered prior to the start time of any of secondary timeslots 145F-I for secondary content 144F-I. Alternatively, in some embodiments, primary content 144A-E can be stored in content storage 118, and as primary content 144A-E is presented, media device 114 may retrieve secondary content 144F-I when there is sufficient space in content storage 118.

At 540, media device 114 pre-buffers secondary content 144F-I. In some embodiments, pre-buffering may include retrieving and storing secondary content 144F-I at any time prior to the scheduled start time for any of secondary timeslots 145F-I of secondary content 144F-I. In other embodiments, media device 114 may pre-buffer by retrieving and storing secondary content 144F-I concurrently with retrieving and storing streaming content 144. In further embodiments, media device 114 separates primary content 144A-E and secondary content 144F-I into respective audio components and visual components, and pre-buffers the audio components and visual components of secondary content 144F-I while primary content 144A-E is presented on display device 104.

At 550, media device 114 may present secondary content 144F-I on display device 104 at secondary timeslots 145F-I on display device 104. In some embodiments, media device 114 pauses presentation of primary content 144A-E at the start time of any of secondary timeslots 145F-I of secondary content 144F-I. Media device 114 may then present secondary content 144F-I while primary content 144A-E is paused.

At 560, media device 114 may resume presentation of primary content 144A-E on display device 104 at the completion of any of secondary timeslots 145F-I of secondary content 144F-I. In some embodiments, resuming the presentation may include pre-buffering primary content 144A-E while secondary content 144F-I is being presented on display device 104. In this way, primary content 144A-E may be provided on display device 104 at the conclusion of the presentation of secondary content 144F-I.

Figure 6:
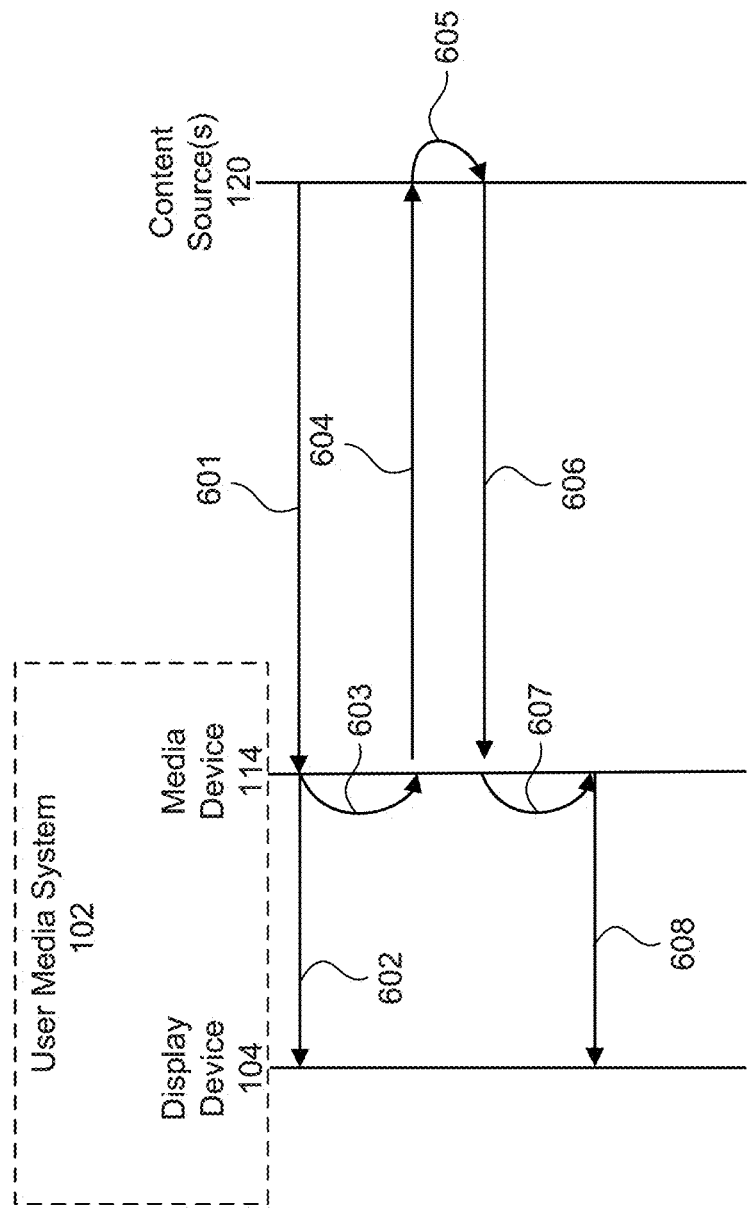
FIG. 6 illustrates communication and functionality in a media system for providing client-side stitching of secondary content, according to some embodiments.

FIG. 6 is a drawing illustrating communication in the media system 100 according to some embodiments. For illustrative purposes, FIG. 6 is described with respect to FIGS. 1A and 1C, but is not limited to these example embodiments. At 601, media device 114 may receive streaming content 144 from content provider(s) 120. In some embodiments, streaming content 144 may include primary content 144A-E. At 602, media device 114 may provide streaming content 144 to display device 104. At 603, media device 114 may analyze metadata 146 of streaming content 144 to identify secondary content 144F-I associated with primary content 144A-E. Analysis may include determining the subject matter of primary content 144A-E or image recognition of images of primary content 144A-E displayed on display device 104.

Based on the analysis, media device 114 requests secondary content 144F-I from content provider(s) 120 at 604, which internally retrieves the requested secondary content 144F-I at 605, and provides secondary content 144F-I to media device 114 at 606. In an alternative embodiment, media device 114 may retrieve secondary content 144F-I locally from content storage 118. In this embodiment, secondary content 144F-I may be pushed to content storage 118 at a predetermined time, such as concurrently with streaming content 144 at 601. In either embodiment, media device 114 pre-buffers secondary content 144F-I at 607. At 607, media device 114 may also analyze metadata 146 of secondary content 144F-I to determine corresponding secondary timeslots 145F-I at which to display the secondary content 144F-I on display device 104. For example, metadata 146 of the secondary content 144F-I includes secondary timeslot 145F-I which indicates a start time in relation to primary content 144A-E in which secondary content 144F-I is to be presented. Media device 114 then presents secondary content 144F-I at any of secondary timeslot 145F-I on display device 104 at 608.

Embodiments Directed to Weave Streaming Content into a Linear Viewing Experience In some embodiments, media systems may be connected to different content provider(s) 120 which may provide different content through different transport mechanisms. For example, a media system 102 may be connected to digital video recorder 111 that provides stored content recorded from an over-the-air broadcaster or cable company, to antenna 115 that receives broadcasted OTA signals, and/or to cable box 113 that receives broadcasted signals from a cable company. Content provided through these types of providers may not be complete on-demand experiences. While a digital video recorder 111 may allow media device 114 to play stored content on demand, often the stored content must first be recorded from a non-on demand provider such as through antenna 115 or cable box 113.

In addition to these types of providers, content provider(s) 120 may also provide streaming content 144 which may provide a complete on-demand experience allowing media device 114 to access and play any content at the request of a user. In some embodiments, content from digital video recorder 111, cable box 113, and antenna 115 may be considered non-streaming content 142 while content received from content provider(s) that provide streaming content 144 may be considered streaming content 144. In some embodiments, some content provider(s) 120 may only provide streaming content 144 and some content provider(s) 120 may only provide non-streaming content 142.

User media system 102 may provide a linear viewing experience by weaving streaming content and streaming content recommendations into non-streaming content 142 while user media system 102 is displaying non-streaming content 142. For example, in an embodiment, media system 102 may be displaying non-streaming content 142 received by digital video recorder 111, cable box 113, or antenna 115. While non-streaming content 142 is displayed on display device 104, user media system 102 may analyze the currently displayed non-streaming content 142 (and/or user viewing history) and may provide related streaming content 144 and/or recommendations regarding streaming content 144 on display device 104.

For example, content provider(s) 120 may be currently providing non-streaming content 142 such as one episode or one season of a television show to user media system 102 (e.g., through cable box 113 or antenna 115). While non-streaming content 142 is displayed on display device 104, user media system 102 may analyze non-streaming content 142. Examples of such analysis include but are not limited to automatic content recognition of non-streaming content 142 that may include detecting metadata related to non-streaming content 142 and generating a fingerprint of non-streaming content 142.

In some embodiments, metadata includes information regarding non-streaming content 142 such as a watermark inserted into the content, the episode name, the subject matter, a television show, and the actors, to name just a few examples. Generating a fingerprint, which is discussed in further detail below, includes generating a score based on any of the metadata and other detected information, such as recognized images from non-streaming content 142. Based on the analysis, user media system 102 may determine streaming content that is associated with non-streaming content 142, and determine content providers that can provide streaming content 144. For example, content provider(s) 120 may provide streaming content 144 related to the currently another episode or another season of the same television show.

In some embodiments, generating a fingerprint of non-streaming content 142 may include recording a clip of a predetermined length (e.g., 10 seconds) and creating a unique identifier representative of the recorded clip. The creation of the unique identifier may be based on fingerprinting algorithms that analyzes the recorded clip, extracts components of the video signal with the recorded clip, and perform signal processing on the video signal. In some embodiments, user media system 102 stores fingerprints and locally compares the generated fingerprint with the stored fingerprints. In other embodiments, user media system 102 may transmit the generated fingerprint to a remote location (not shown) which compares the generated fingerprint with fingerprints that are stored at the remote location.

Accordingly, user media system 102 may provide or recommend episodes of a television show in succession (e.g., episode 4 of season 3 followed by episode 5 of season 3) from content provider(s) 120 that provide streaming content 144 after providing one of the episodes as non-streaming content 142. Such content may be considered episodic because the content is related to other related content, such as different episodes of a television show. In some embodiments, user media system 102 may provide or recommend the related streaming episodes in a successive or ordered manner to form a linear viewing experience. In other embodiments, another type of linear viewing experience may also include viewing the same episode from the beginning. For example, if user media system 102 starts providing non-streaming content 142 at the middle of the content's playback (e.g., in the middle of an episode being broadcasted over-the-air), user media system 102 may provide or recommend streaming content (e.g., the same episode) from content provider(s) 120 that provide streaming content 144. Providing the streaming content allows user media system 102 to display the episode from the beginning, or the first segment, but using streaming content 144 instead of non-streaming content 142.

Accordingly, user media system 102 provides a linear viewing experience by retrieving content and/or segments from across different content provider(s) 120 that provide non-streaming content 142 and/or streaming content 144, and weaving together the retrieved streaming content 144 and/or segments with non-streaming content 142. This may be called weave streaming content to produce a linear viewing experience.

In some embodiments, while user media system 102 accesses non-streaming content 142 from a content provider(s) 120, e.g., broadcaster, a cable provider or a satellite provider, media device 114 may monitor non-streaming content 142, create a fingerprint of non-streaming content 142 from the content provider(s) 120, and generate and display recommendations on user media system 102. The recommendations may include an indication of streaming content 144 that is determined to be related to non-streaming content 142 or the actual streaming content 144 itself. The recommendations may also include an indication of one or more content provider(s) 120 that provide streaming content 144 in the form of recommended content to user media system 102. For example, when user media system 102 accesses non-streaming content 142 from content provider(s) 120 when non-streaming content 142 is past its starting point, e.g., in a middle of a movie or a television program, media device 114 may provide a recommendation to one or more content provider(s) 120 that provide streaming content 144 where the same movie or television program can be accessed from the beginning of the movie or current episode. In other embodiments, recommendations may include streaming content 144 associated with the current season of non-streaming content 142 or other streaming content 144 associated with the same television show but different seasons. In this manner, user media system 102 may weave together content and/or segments between content provider(s) 120 that provide different versions of non-streaming content 142 and/or streaming content 144 in an ordered manner which allows for a linear viewing experience.

In addition, or in the alternative, media device 114 may provide recommendations for content within the same genre as the currently displayed non-streaming content 142 and one or more content provider(s) 120 that provides streaming content 144 where such recommendations can be accessed. In various embodiments, media device 114 may provide such recommendations using an interactive overlay on the video content. For example, media device 114 may generate a pop-up indicating that the television episode or movie that is currently viewed as non-streaming content 142 is available as streaming content 144 from one or more content provider(s) 120. User media system 102 may receive user inputs, as from remote control 138, that direct user media system 102 to access and display the streaming content 144 from one or more of the content provider(s) 120.

Figure 7:
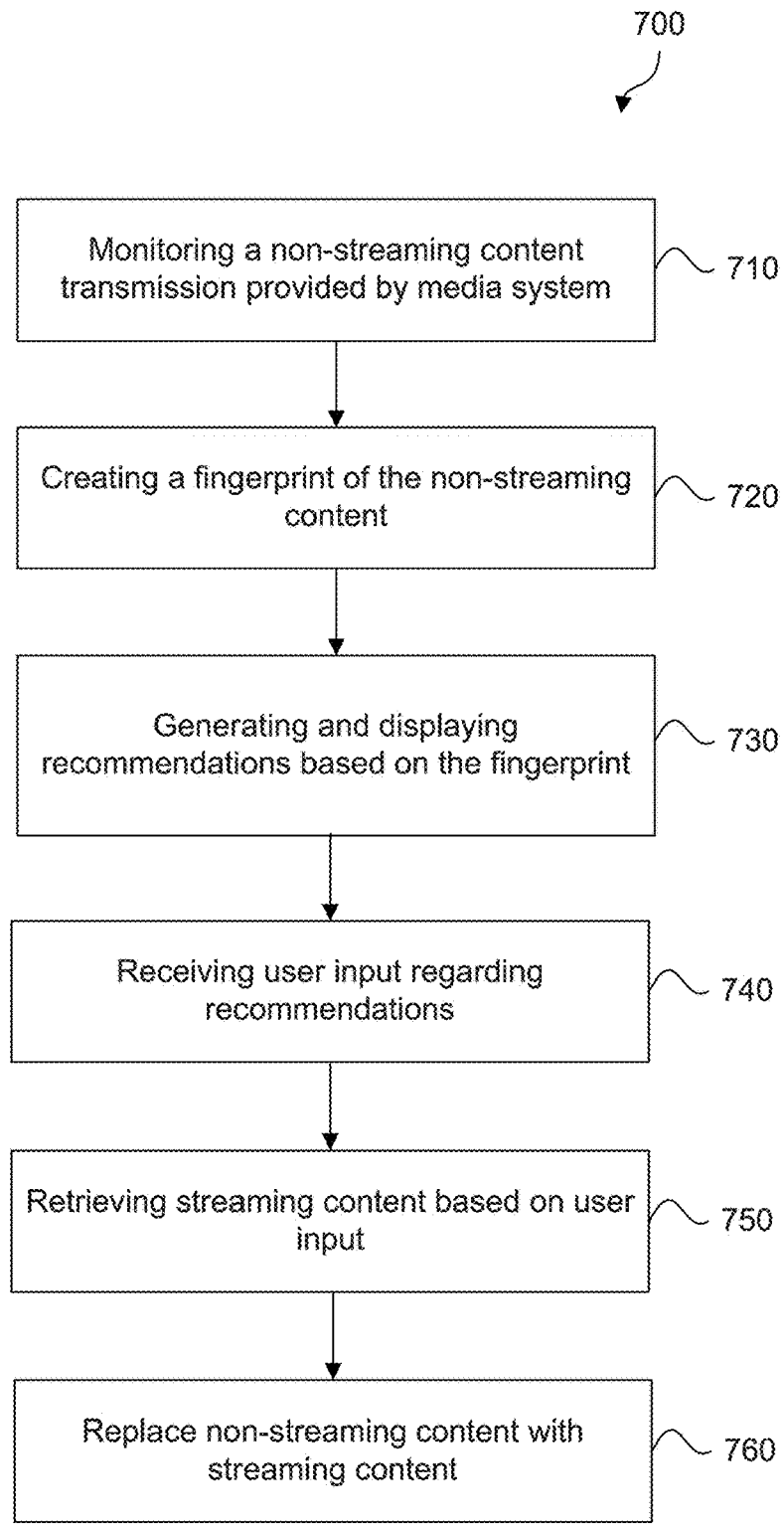
FIG. 7 illustrates a method for weave streaming content into a linear viewing experience, according to some embodiments.

FIG. 7 illustrates method 700 for weaving streaming content into a linear viewing experience, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

At 710, media device 114 may monitor non-streaming content 142 currently provided to display device 104. Non-streaming content 142 may be received from content provider(s) 120 that only provide non-streaming content 142 (e.g., through cable box 113 or antenna 115). Non-streaming content 142 may be provided to media device 114 through digital video recorder 111, cable box 113, and/or antenna 115, to name just a few examples. In some embodiments, monitoring non-streaming content 142 includes monitoring metadata associated with non-streaming content 142, performing real-time analysis of non-streaming content 142 such as image recognition, audio recognition, and other methods of identifying content that is currently being displayed on display device 104, and or monitoring playback conditions associated with the non-streaming content. Playback conditions may include but are not limited to the channel associated with non-streaming content 142 (e.g., the local channel that broadcast the non-streaming content either over the air or through the cable box), an airing time associated with non-streaming content 142 (e.g., a time period when the non-streaming content was broadcast over the air and received by user media system 102), or the duration of time that media system 102 is providing non-streaming content 142.

At 720, media device 114 may create a fingerprint of the non-streaming content 142 currently displayed on the display device 104. In some embodiments, media device 114 may automatically create a fingerprint of any non-streaming content 142 displayed on display device 104. In other embodiments, media device 114 may initiate the creation of a fingerprint on the basis of monitoring non-streaming content 142 in 710. For example, media device 114 may determine that non-streaming content 142 (e.g., a television show) has been displayed on display device for a predetermined duration of time (e.g., 5 minutes) which may indicate that the user is interested in related streaming content 144. Accordingly, media device may create a fingerprint in 720. A shorter duration of time (e.g., 2 minutes) may indicate that the user is switching between different non-streaming content 142 (e.g., flipping channels) and the user would not be interested in related streaming content 144.

In some embodiments, user media system 102 creates a fingerprint by analyzing images of the non-streaming content 142 to identify the type or genre of the non-streaming content 142. Also or alternatively, the media device 114 may determine a genre of the non-streaming content 142 being displayed on the display device 104 by analyzing metadata 146 associated with such non-streaming content 142. In other words, fingerprints may be determined based on metadata 146 associated with the non-streaming content 142. Such metadata 146 may include any information about the displayed non-streaming content 142 including, but not limited to, the genre of the content, actors, writers, directors, title, number of seasons, number of episodes, etc. In some embodiments, the fingerprint of non-streaming content 142 may be represented by information regarding the non-streaming content 142 or a numerical value such as a score. The score of the non-streaming content 142 being displayed on display device 104 can be compared with fingerprints of other non-streaming content 142 to identify similar or related content.

In other embodiments, user media system 102 may create the fingerprint by analyzing playback conditions, such as the original channel and air time for example, of the non-streaming content 142. For example, the original channel may be the channel associated with the broadcaster through which antenna 115 and/or cable box 113 received the non-streaming content. Similarly, the air time may be the time at which antenna 115 and/or cable box 113 received non-streaming content 142. As one non-limiting example, user media system 102 may determine that non-streaming content 142 currently provided to (that is, displayed on) display device is received from antenna 115 from a local channel at 8:00 pm. Based on these playback conditions, user media system 102 may retrieve content data such as the name of the television show that is typically provided by the local channel at that time. User media system 102 may then generate a fingerprint, such as a numerical value or information regarding the non-streaming content 142, based on this retrieved content data and playback conditions.

At 730, media device 114 generates recommendations associated with the non-streaming content 142 based on the fingerprint created in 720. In some embodiments, recommendations may indicate one or more content provider(s) 120 that provide streaming content 144 similar or related to non-streaming content 142 currently being displayed on display device 104 on the basis of the created fingerprints in 720. For example, user media system 102 may determine from a fingerprint generated for non-streaming content 142 that the non-streaming content 142 is a television program that is typically broadcast on Thursday at 8:30 pm. User media system 102 may then determine whether the television program or other content related to the television program is available from content provider(s) 120 that provide only streaming content 144. In this way, user media system 102 may be able to identify a streaming version of non-streaming content 142 that would allow media system 102 to play the television program at different points including its beginning or other earlier segments. As another example, additional content may include but is not limited to other episodes related to the non-streaming content 142 currently being provided to display device 104, from the same or different television seasons, or even from different but related television shows or movies.

In addition, or in the alternative, at 730, media device 114 provides recommendations for the related streaming content 144 such as content within the same genre (or other criteria such as the same actors, directors, writers, years, etc.) based on the fingerprint of the non-streaming content. The recommendations may be displayed on display device 104. In various embodiments, such recommendations may be displayed using an interactive overlay over the currently playing non-streaming content 142. For example, the overlay may be a pop-up indicating that the television episode or movie of the currently viewed non-streaming content 142 is available on one or more content provider(s) 120 that can provide a streaming version of non-streaming content 142.

In 740, media device 114 may receive a user input regarding the displayed recommendations. In some embodiments, the user input is received from remote control 138 such as from a user interacting with user interface and command module 128. The user input may indicate a selection of a recommendation from the displayed recommendations. In 750, media device 114 retrieves the streaming content 144 identified by, associated with or based on the user input. In some embodiments, media device 114 may send a request to content provider(s) 120 that provide streaming content 144 while non-streaming content 142 is currently displayed on display device 104.

In 760, media device 114 may stop playback of currently displayed non-streaming content 142 and begin playback of the retrieved streaming content 144 on display device 104. In some embodiments, media device 114 may provide a prompt on display device 104 and wait for user input prior to initiating playback of the retrieved streaming content 144.

Example Computer System

Figure 8:
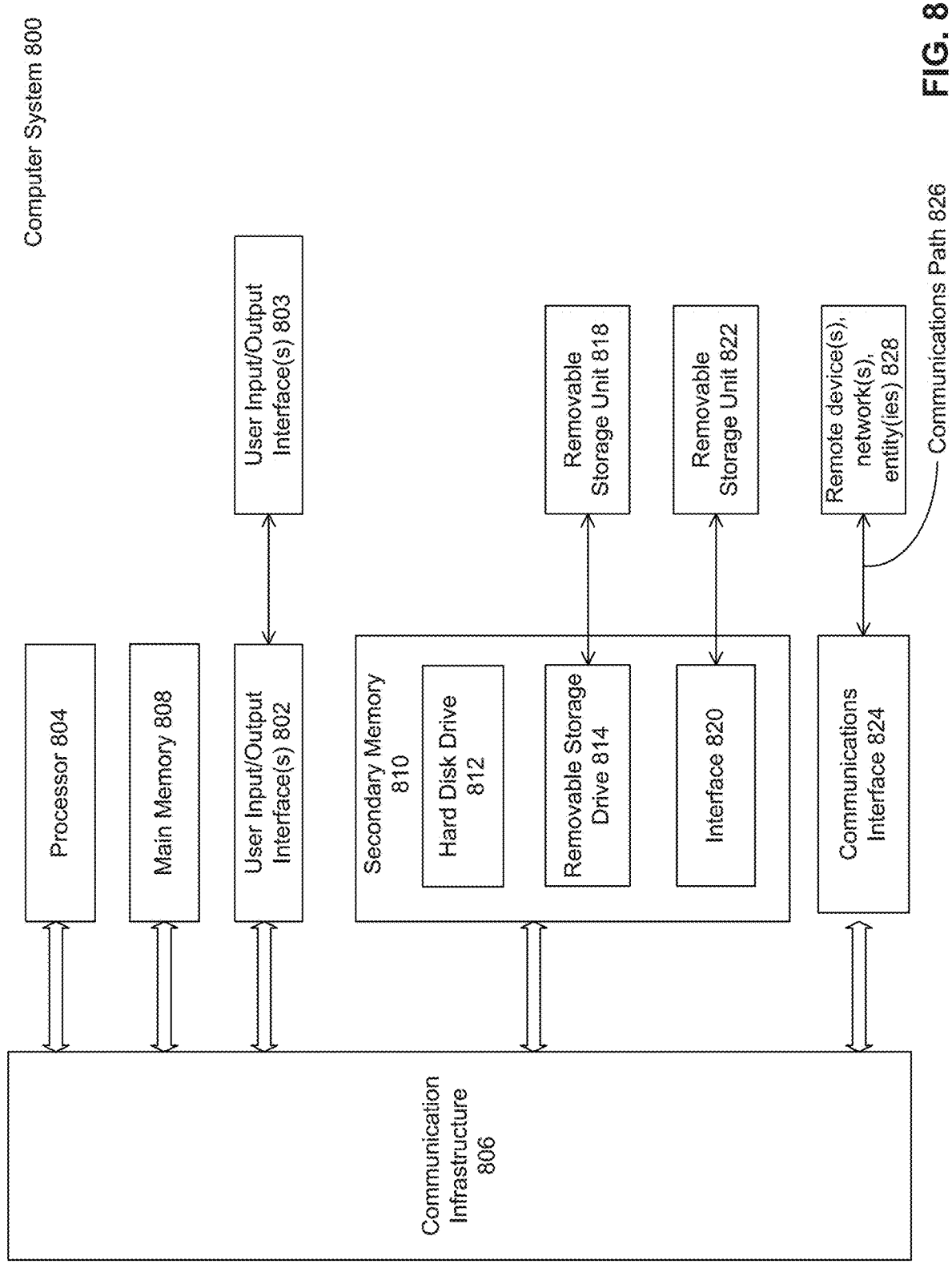
FIG. 8 illustrates an example computer system useful for implementing various embodiments.

Various embodiments and/or components therein can be implemented, for example, using one or more computer systems, such as computer system 800 shown in FIG. 8. Computer system 800 can be any computer or computing device capable of performing the functions described herein.

Computer system 800 includes one or more processors (also called central processing units, or CPUs), such as a processor 804. Processor 804 is connected to a communication infrastructure or bus 806.

One or more processors 804 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure or bus 806 through user input/output interface(s) 802.

Computer system 800 also includes a main or primary memory 808, such as random access memory (RAM). Main memory 808 can include one or more levels of cache. Main memory 808 has stored therein control logic (i.e., computer software) and/or data.

Computer system 800 can also include one or more secondary storage devices or memory 810. Secondary memory 810 can include, for example, a hard disk drive 812 and/or a removable storage device or drive 814. Removable storage drive 814 can be a floppy disk drive, a magnetic tape drive, a compact disk drive, an optical storage device, tape backup device, and/or any other storage device/drive.

Removable storage drive 814 can interact with a removable storage unit 818. Removable storage unit 818 includes a computer usable or readable storage device having stored thereon computer software (control logic) and/or data. Removable storage unit 818 can be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 can include other means, instrumentalities or other approaches for allowing computer programs and/or other instructions and/or data to be accessed by computer system 800. Such means, instrumentalities or other approaches can include, for example, a removable storage unit 822 and an interface 820. Examples of the removable storage unit 822 and the interface 820 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 can further include a communication or network interface 824. Communication interface 824 enables computer system 800 to communicate and interact with any combination of remote devices, remote networks, remote entities, etc. (individually and collectively referenced by reference number 828). For example, communication interface 824 can allow computer system 800 to communicate with remote devices 828 over communication path 826, which can be wired and/or wireless, and which can include any combination of LANs, WANs, the Internet, etc. Control logic and/or data can be transmitted to and from computer system 800 via communication path 826.

In some embodiments, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments of the disclosure as contemplated by the inventors, and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of the disclosure should not be limited by any of the above-described exemplary embodiments, but should be defined only in accordance with the following claims and their equivalents.

What is claimed is:

1. A method for providing streaming recommendations based on non-streaming content presented by a media device, the method comprising:

monitoring, by the media device for a predetermined period of time, playback of a first video content at the media device, wherein the first video content is non-streaming content provided by a first content provider, wherein the predetermined period of time represents a duration in which the first video content has been displayed by the media device;

creating, after the predetermined period of time, a fingerprint of the first video content, wherein the fingerprint is based on at least a type of the first video content;

identifying a plurality of second video content based at least in part on the fingerprint, wherein the plurality of second video content includes a streaming version of the first video content from a second content provider and at least one recommendation associated with the first video content;

displaying, by the media device, the plurality of second video content as an overlay over the first video content;

receiving, responsive to displaying the plurality of second video content, a user selection of a second video content of the plurality of second video content, wherein the second video content comprises the streaming version of the first video content and the at least one recommendation associated with the first video content;

transmitting, responsive to the user selection, a request for the second video content from the second content provider while presenting the first video content;

receiving the second video content from the second content provider, wherein the second video content includes a plurality of primary timeslots and a plurality of secondary timeslots and further including primary content inserted into the plurality of primary timeslots and secondary content inserted into the plurality of secondary timeslots;

displaying the first video content, the streaming version of the first video content, and the at least one recommendation associated with the first video content in an ordered manner;
retrieving interactive content associated with the secondary content; and
inserting the interactive content into another secondary timeslot of the plurality of secondary timeslots.

2. The method of claim 1, wherein the monitoring the first video content comprises monitoring the first video content when the media device accesses the first video content from the first content provider.

3. The method of claim 2, wherein the creating the fingerprint further comprises at least one of:
analyzing the first video content to identify content within the first video content;
analyzing a playback condition associated with the first video content; and
analyzing the first video content to determine a genre of the first video content.

4. The method of claim 3, wherein the identifying the plurality of second video content comprises comparing the fingerprint with content data associated with the plurality of second video content.

5. The method of claim 4, wherein the monitoring the first video content comprises determining when the media device displays the first video content at a predetermined time location.

6. The method of claim 5, further comprising:
presenting the second video content at a starting time location, wherein the starting time location is prior to the predetermined time location.

7. The method of claim 1, further comprising:
after receiving the second video content, stopping the playback of the first video content; and
streaming the second video content at the media device.

8. The method of claim 1, further comprising:
receiving, by the media device, the first video content through an antenna or cable connected to the media device.

9. A system for providing streaming recommendations based on non-streaming content, the system comprising:
at least one processor; and
a memory operatively coupled to the at least one processor, the memory configured to store program code that when executed causes the processor to perform operations comprising:
monitoring, for a predetermined period of time, playback of a first video content being presented by a media device, wherein the first video content is retrieved from a first content provider and wherein the first video content is a first portion of a media program, wherein the predetermined period of time represents a duration in which the first video content has been displayed by the media device;
creating, after the predetermined period of time and while the first video content is being displayed by the media device, a fingerprint of the first video content, wherein the fingerprint is based on at least a type of the first video content;
identifying a plurality of second video content based at least in part on the fingerprint, wherein the plurality of second video content includes a second portion of the media program from a second content provider and at least one recommendation associated with the first video content;

displaying, by the media device, the plurality of second video content as an overlay over the first video content;
receiving, responsive to displaying the plurality of second video content, a user selection of a second video content of the plurality of second video content, wherein the second video content comprises the second portion of the media program and the at least one recommendation associated with the first video content;
transmitting, responsive to the user selection, a request for the second video content from the streaming content provider while presenting the first video content;
receiving the second video content from the second content provider, wherein the second video content includes a plurality of primary timeslots and a plurality of secondary timeslots and further including primary content inserted into the plurality of primary timeslots and secondary content inserted into the plurality of secondary timeslots;
displaying the first video content, the second portion of the media program, and the at least one recommendation associated with the first video content in an ordered manner;
retrieving interactive content associated with the secondary content; and
inserting the interactive content into another secondary timeslot of the plurality of secondary timeslots.

10. The system of claim 9, wherein the operations further comprise monitoring the first video content when the media device accesses the first video content from the second content provider.

11. The system of claim 10, wherein the operations further comprise at least one of:
analyzing the first video content to identify content within the first video content;
analyzing a playback condition associated with the first video content; and
analyzing the first video content to determine a genre of the first video content.

12. The system of claim 11, wherein the operations further comprise determining when the media device displays the first video content at a predetermined time location.

13. The system of claim 12, wherein the operations further comprise:
presenting the second video content at a starting time location, wherein the starting time location is prior to the predetermined time location.

14. The system of claim 9, wherein the operations further comprise:
after receiving the second video content, stopping the playback of the first video content; and
streaming the second video content at the media device.

15. The system of claim 9, wherein the first portion of the media program comprises a first episode and the second portion of the media program comprises a second episode that follows in succession to the first episode.

16. A non-transitory, tangible computer-readable medium having instructions stored thereon that, when executed by at least one computing device, cause the at least one computing device to perform operations comprising:
accessing a first video content at a first time location, wherein the first time location is subsequent to a starting point of the first video content;
monitoring, for a predetermined period of time, playback of the first video content being presented by a media device, wherein the first video content is retrieved from a first content provider, wherein the first video content is a first portion of a media program and wherein the predetermined period of time represents a duration in which the first video content has been displayed by the media device;

creating, after the predetermined period of time, a fingerprint of the first video content, wherein the fingerprint is based on at least a type of the first video content;

identifying a plurality of second video content based at least in part on the fingerprint, wherein the plurality of second video content includes a second portion of the media program from a second content provider and at least one recommendation associated with the first video content;

displaying, by the media device, the plurality of second video content as an overlay over the first video content;

receiving, responsive to displaying the plurality of second video content, a user selection of a second video content of the plurality of second video content, wherein the second video content comprises the second portion of the media program and the at least one recommendation associated with the first video content;

transmitting, responsive to the user selection, a request for the second video content from the second content provider while presenting the first video content by the media device;

responsive to transmitting the request, streaming the second video content at a second time location of the media program, wherein the second video content includes a plurality of primary timeslots and a plurality of secondary timeslots and further including primary content inserted into the plurality of primary timeslots and secondary content inserted into the plurality of secondary timeslots;

displaying the first video content, the second portion of the media program, and the at least one recommendation associated with the first video content in an ordered manner;

retrieving interactive content associated with the secondary content; and inserting the interactive content into another secondary timeslot of the plurality of secondary timeslots.

17. The non-transitory, tangible computer-readable medium of claim 16, wherein the creating the fingerprint comprises at least one of:

analyzing the first video content to identify content within the first video content;

analyzing a playback condition associated with the first video content; and analyzing the first video content to determine a genre of the first video content.

18. The non-transitory, tangible computer-readable medium of claim 17, wherein the monitoring the first video content being presented by the media device comprises monitoring the first video content when the media device accesses the first video content from the first content provider.

19. The non-transitory, tangible computer-readable medium of claim 16, wherein the operations further comprise:

after receiving the second video content, stopping the playback of the first video content; and streaming the second video content at the media device.

20. The non-transitory, tangible computer-readable medium of claim 16, wherein the second time location is a starting point of the media program.

* * * * *